July 5, 1966 R. L. GARWIN 3,259,887
SUPERCONDUCTIVE PERSISTENT CURRENT APPARATUS
Filed Oct. 15, 1956 6 Sheets-Sheet 1

INVENTOR.
RICHARD L. GARWIN
BY
Paul M Enlow
AGENT

STORE "1"

STORE "0"

INVENTOR
RICHARD L. GARWIN

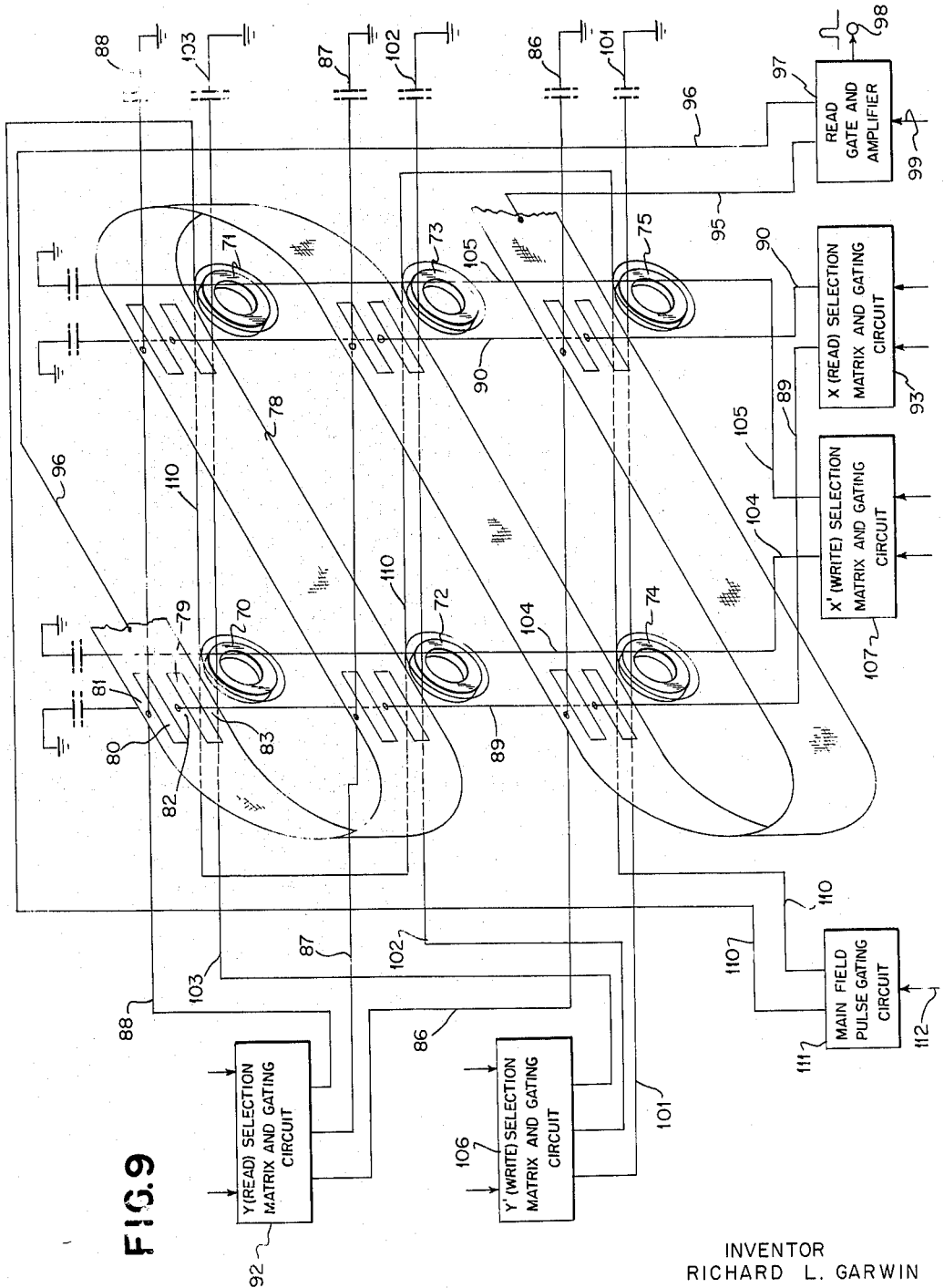

July 5, 1966 R. L. GARWIN 3,259,887
SUPERCONDUCTIVE PERSISTENT CURRENT APPARATUS
Filed Oct. 15, 1956 6 Sheets-Sheet 4

*INVENTOR.*
RICHARD L. GARWIN
BY Paul McEnlow
AGENT

July 5, 1966 R. L. GARWIN 3,259,887
SUPERCONDUCTIVE PERSISTENT CURRENT APPARATUS
Filed Oct. 15, 1956 6 Sheets-Sheet 5

INVENTOR
RICHARD L. GARWIN
BY
AGENT

July 5, 1966  R. L. GARWIN  3,259,887
SUPERCONDUCTIVE PERSISTENT CURRENT APPARATUS
Filed Oct. 15, 1956  6 Sheets-Sheet 6
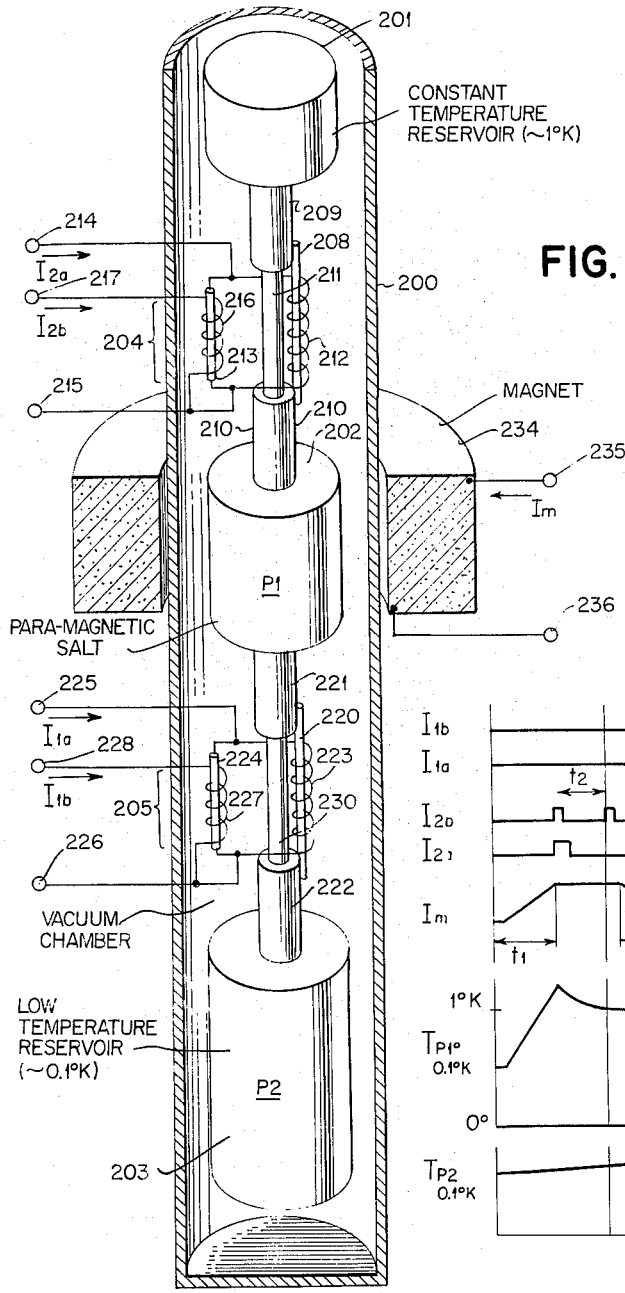
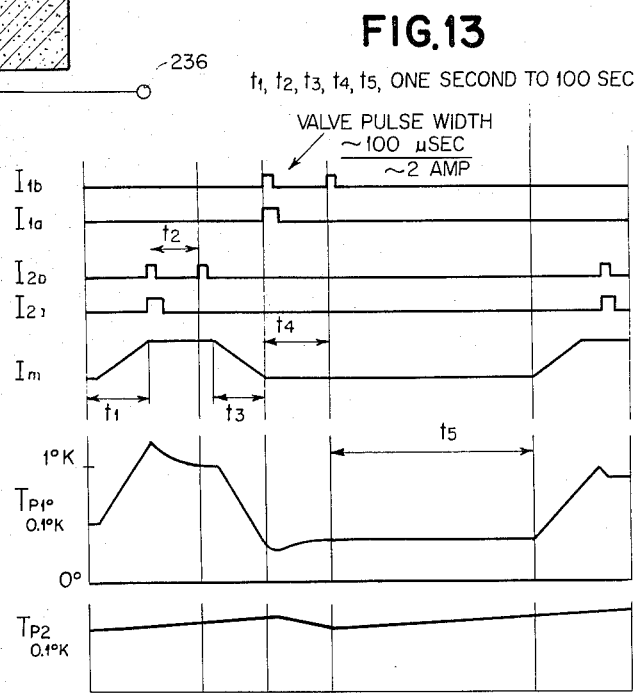
INVENTOR
RICHARD L. GARWIN
BY *Paul M Enlou*
AGENT

3,259,887
SUPERCONDUCTIVE PERSISTENT CURRENT APPARATUS
Richard L. Garwin, Scarsdale, N.Y., assignor to International Business Machines Corporation, New York, N.Y., a corporation of New York
Filed Oct. 15, 1956, Ser. No. 615,814
37 Claims. (Cl. 340—173.1)

This invention relates to superconducting elements for storing induced persistent currents and more particularly, to the use of induced persistent currents for information storage and control purposes.

It is known that the electrical resistance of a material decreases with temperature and that certain materials become superconducing when they are cooled to a temperature close to absolute zero (0° K.). When a material is in a superconductive state, its resistance is equal to zero.

When a magnetic field is applied to a superconducting material, the normal resistance of the material is restored and the material ceases to be superconductive at a predetermined field strength which is a function of the temperature and the characteristics of the material. This field strength is known as the critical field of the material. The prior art includes devices wherein the two states (i.e., the normal and superconductive states) of a conductor exhibiting superconductive properties are utilized to represent the storage of information or to effectuate logical control functions. In such structures the conductor is superconductive when the external magnetic field is less than the critical field and is rendered normal when the magnetic field exceeds the critical field. In order to maintain such a conductor in a superconductive state, no external electrical energy need be applied to a circuit incorporating the conductor; but the second state, i.e., the normal state, is maintainable only through the continuous application of a magnetic field to the conductor. This magnetic field is generally produced by a coil surrounding the conductor, and thus necessitates the continual application of electrical current to the coil in order to maintain the normal state.

The present invention utilizes the phenomenon of induced persistent currents induced in a closed current path fabricated from superconductive material. When a closed current path is entirely superconductive, a current induced therein will persist since the resistance of the path is zero. A persistent current continues to circulate in the path without the continuous application thereto of electrical energy from an external source. A persistent current is eliminated only by rendering a portion of the path normal for a time sufficient to dissipate the current in the normal resistance introduced in the path. Thus, a closed current path formed of superconductive material may exhibit two states which are represented by the presence or absence of a persistent current therein. Also, the magnitude of a current can be stored in the closed path, as where the relative magnitudes of several currents are representative of information.

The present invention relates to the storage of persistent currents in a continuous loop of superconductive material. The invention may be utilized to store information, as for example, a binary one and a binary zero may arbitrarily be represented by the presence and absence of a persistent current, respectively, or vice versa. Also, the invention may be used to store a current whose magnitude is a function of the applied magnetic field. The invention may also be utilized to control a heat switch. A superconductive material exhibits relatively high and low thermal conductivity in its normal and superconductive states, respectively. The heat switch includes an additional superconductive element for controlling the flow of heat and is disposed adjacent to a portion of the superconductive storage loop. The magnetic field created by a persistent current in said loop renders the additional element normal, thus permitting the passage of heat therethrough. Thus the presence or absence of a persistent current in the superconductive loop respectively renders said additional element normal or superconductive to thereby provide a heat switch capable of controlling thermal conductivity of an element without requiring the continuous application of electrical energy to the switch.

Each superconductive storage loop referred to herein as a storage cell may comprise a single material, or may be fabricated of two superconductive materials arranged in series, one having a higher critical field than the other. Means are provided adjacent to each storage cell to selectively induce therein, during a STORE interval, a persistent current or no current, and further means are provided to sense, during a READ interval, a representation of the presence or absence of a persistent current in the loop.

During a STORE interval, a magnetic field greater than the critical field, is applied to a storage cell to render at least a portion thereof normal. The normal resistance of the normalized portion of the loop dissipates any persistent current previously circulating within the loop. At the termination of the STORE interval, the magnetic field is removed thereby permitting the entire loop to return to its superconductive state. If flux from a magneic field is permitted to encompass a predetermined portion of the storage cell following the transition from the normal to the superconductive state, a persistent current is induced in the loop when said flux is removed. The persistent current circulates in the storage loop as long as the loop remains entirely superconductive. However, if following the transition from the normal to the superconductive state at the termination of the STORE interval, there is no flux linking said predetermined portion of the loop, a persistent current is not induced therein.

The presence of a persistent current in a storage loop is sensed during a READ interval by sensing the presence or absence of a magnetic field about the storage loop created by the persistent current. A superconductive sense ribbon having a current passing therethrough is located adjacent to each storage loop. If a persistent current is circulating within the loop, the magnetic field created by said current renders a segment of the sense ribbon normal so as to produce a voltage drop across the ribbon. The voltage drop across the sense ribbon is amplified and utilized to indicate the presence of a stored persistent current.

A principal object of the invention is to provide novel means for inducing and storing a persistent current in a closed current path fabricated from a superconductive material.

Another object is to provide a simple circuit for storing a persistent current indefinitely.

A further object is to provide a novel storage circuit including first and second superconductive materials arranged serially in a closed current path and having different critical field values, means for rendering one of said materials normal by exceeding the critical field thereof, and further means for inducing a persistent current in said path by selectively controlling the application of a magnetic field to the closed path.

Another object is to provide circuitry operable in the superconductive region for inducing persistent currents in a storage cell having a memory element fabricated of a thin film of superconductive material approximately $10^{-3}$ to $10^{-5}$ centimeters thick.

Another object is to provide a novel method of inducing a persistent current in a superconducting closed current path by first applying a magnetic field to a first segment of said path to render it normal, linking a second segment of said path by a magnetic flux, and finally removing said magnetic field to induce a current therein whereby said current persists indefinitely. A still further object is to provide a novel storage cell including a superconducting inductance in parallel with a superconducting conductor, and means for inducing and detecting a persistent current flowing in said cell.

A further object is to provide a matrix of superconductive storage cells for storing binary information including means for selectively storing or reading out information from a predetermined cell.

Another object is to provide a novel means for selectively sensing information stored in any of a plurality of superconductive elements.

An additional object is to provide a novel non-destructive read-out means for sensing the presence or absence of a persistent current circulating in a closed superconducting current path without destroying said current.

A further object is to provide a novel means for sensing the presence or absence of a persistent current in one of a plurality of superconducting loops of a storage matrix, comprising a superconducting sensing strip disposed adjacent to each of said loops so that a first portion of said strip is rendered normal by the magnetic field produced by a persistent current, a horizontal selection conductor for rendering normal a second portion of said strip adjacent to said first portion, and a vertical selection conductor for rendering normal a third portion of said strip adjacent to said second portion, whereby the normal resistance of said first, second, and third portions of said strip produce a voltage signal indicative of the presence of a persistent current in the loop selected.

A further object is to provide a method of fabricating a memory plane comprising a plurality of elements for storing persistent currents including selective means for storing information in said elements and for sensing information previously stored in said elements.

Another object is to provide an improved thermal valve which is controlled by a persistent current flowing in a superconducting path.

A further object is to provide an improved thermal switch for controlling heat flow employing a superconducting thermal element which respectively functions as a thermal conductor or a thermal insulator when it is in the normal or superconductive state, the state of said thermal element being controlled by the presence or absence of a persistent current circulating in a closed loop adjacent to said element.

Another object is to provide means for utilizing a persistent current flowing in a superconducting medium to control the extracting of heat from a low temperature reservoir by magnetic work producing means.

An object is to provide a novel means for controlling thermal links for selectively providing a heat current path between a paramagnetic salt and a constant temperature reservoir or a low temperature reservoir from which heat is extracted.

It is also an object to provide an improved adiabatic demagnetization refrigerator having a paramagnetic salt as a working substance, a first high temperature reservoir, a second low temperature reservoir, a first thermal switch comprising a thermal link the superconductive state of which is controllable by a persistent current circulating in a superconducting loop, said first switch disposed between said salt and said first reservoir, and a second thermal switch similar to said first switch and disposed between said salt and said second reservoir.

A further object is to provide means for controlling a superconductive heat switch through the use of an induced persistent current circulating in a superconductive loop.

Other objects of the invention will be pointed out in the following description and claims and illustrated in the accompanying drawings, which disclose, by way of example, the principle of the invention and the best mode, which has been contemplated, of applying that principle.

Figure 4:
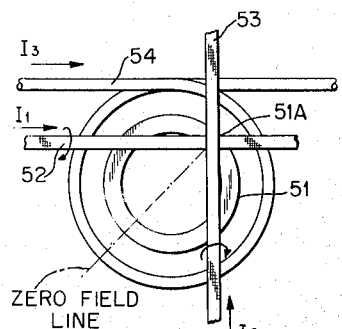
FIG. 4 shows a first embodiment of a superconductive storage cell.
Figure 4A:
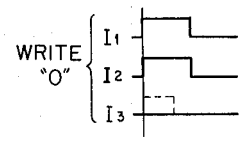
Figure 4B:
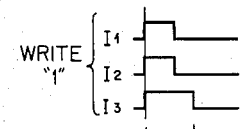
Figure 5:
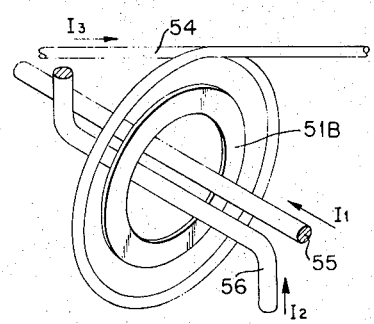
Figure 6:
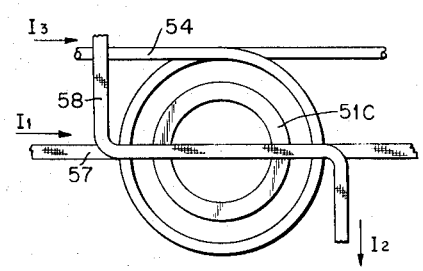
Figure 7A:
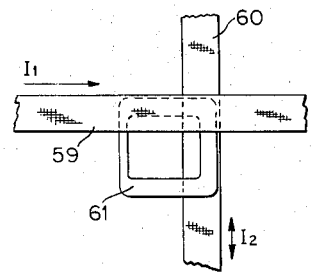
Figure 7B:
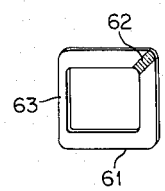
Figure 7C:
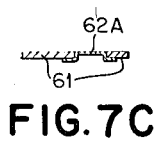
Figure 8A:
Figure 8B:
Figure 10:
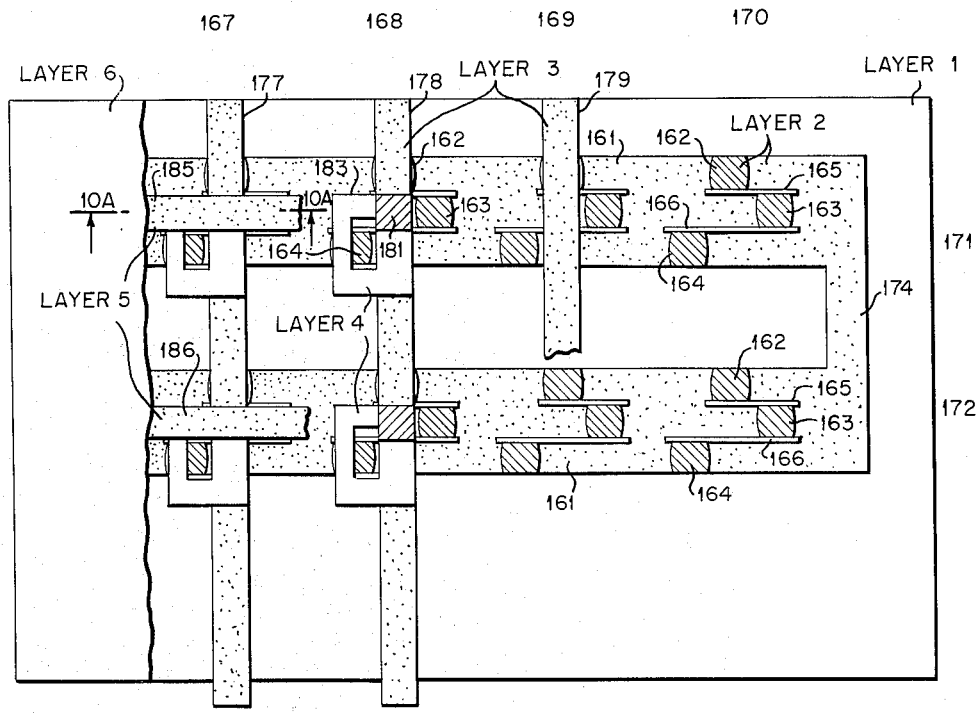
Figure 10A:
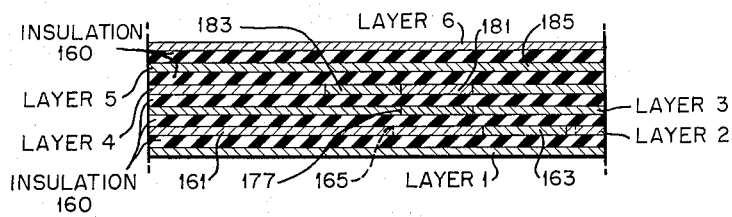
Figure 11:
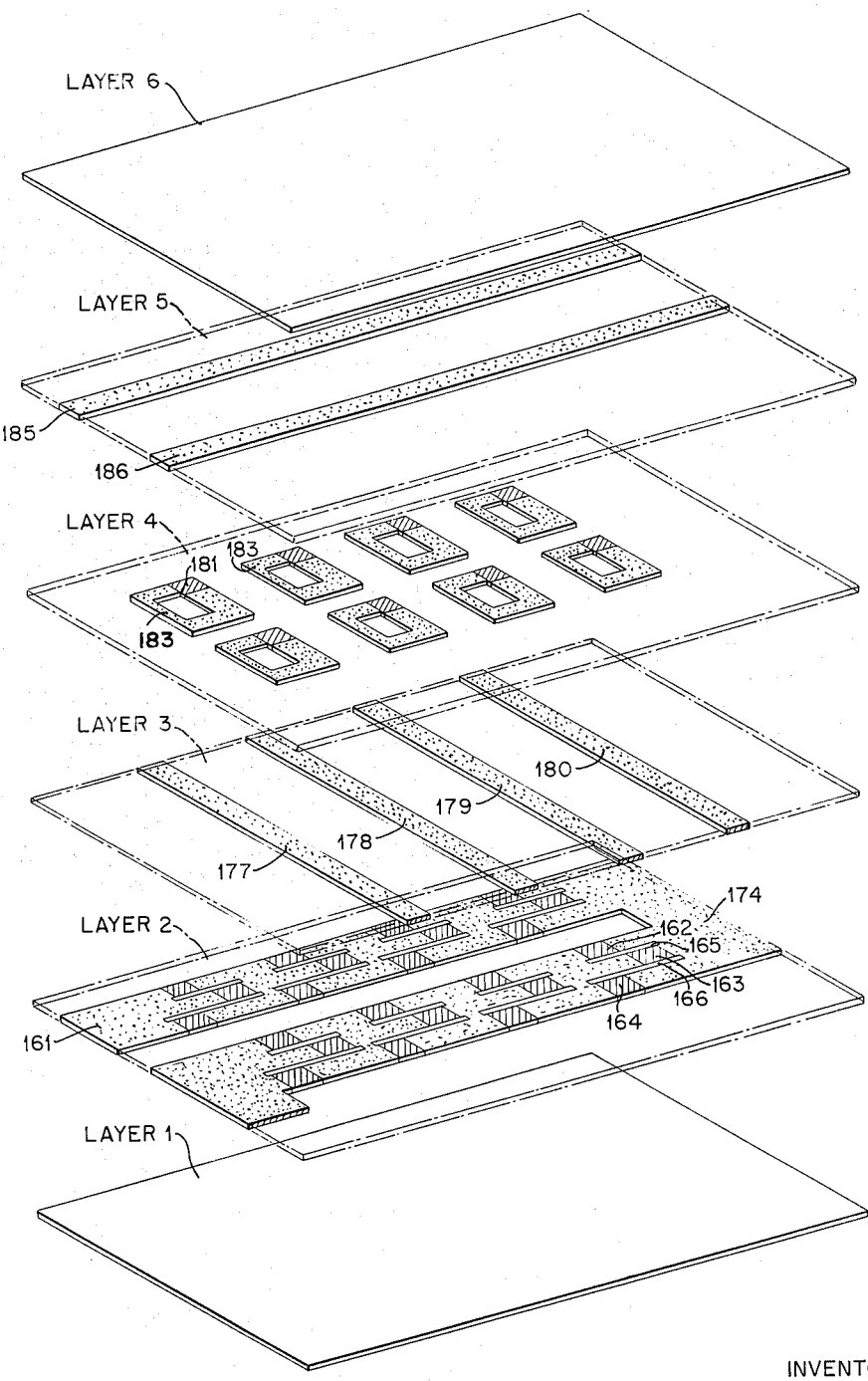

FIGS. 4A and 4B indicate the waveforms of the currents required to operate the cells of FIGS. 4–6;

FIG. 5 illustrates a second embodiment of a superconductive storage cell;

FIG. 6 illustrates a third embodiment of a superconductive storage cell;

FIGS. 7A, 7B and 7C illustrate a fourth embodiment of a superconductive storage cell;

FIGS. 8A and 8B depict current directions associated with the embodiment of FIG. 7A required to store binary information;

FIG. 9 shows a plane of a storage matrix embodying the invention;

FIG. 10 is a cut-away view of a storage plane for storing persistent currents;

FIG. 10A is a sectional view of FIG. 10;

FIG. 11 is an expanded view of the storage plane of FIG. 10;

FIG. 12 illustrates an adiabatic demagnetization refrigerator utilizing stored persistent currents for control purposes; and FIG. 13 depicts an operation cycle of the apparatus of FIG. 12.

Figure 1:
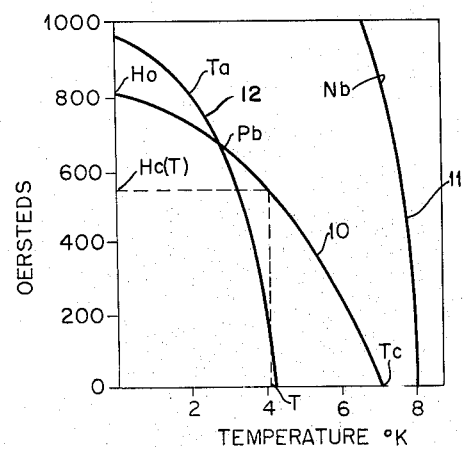
FIG. 1 is a graph of magnetic field versus temperature for a typical superconductive material.

For each superconductive material a graph of magnetic field versus temperature can be plotted which characterizes the important properties of the particular superconductor. The transition curves for lead, niobium, and tantalum are shown in FIG. 1 as curves 10, 11 and 12. A material is said to be in a superconductive state when the relationship between the applied magnetic field and the temperature of the material is such that the intersection of these values lies in the area beneath the curve of FIG. 1 corresponding to the material. However, if either the temperature or the magnetic field surrounding the material is increased whereby the intersection of these values occurs in the area above the appropriate curve, the material is said to be in the "normal" state.

With respect to FIG. 1, consider that the superconductor is lead, for example, and is cooled to temperature T. As long as the magnetic field applied to the conductor is less than the value $H_c(T)$, the conductor will exist in a superconductive state. If the magnetic field is now increased above the value $H_c(T)$, the conductor is transformed to the normal conductive state. The field strength $H_c$ at which the transition from the superconductive to the normal state occurs is called the critical field. Hence, it is seen that when the temperature of a superconductor is maintained at a constant value, the increasing and decreasing of the magnetic field controls the resistance of the conductor by causing the properties thereof to shift back and forth between its superconducting normal states respectively. FIG. 1 also indicates that in order to control the conductive state of a superconductor by controlling the magnetic field, the temperature of the conductor must be maintained at a value below the transition temperature corresponding to zero magnetic field.

The magnetic field may be an externally applied field or may be produced by the current flowing through the superconductive element, or may be a combination of both these fields. The critical magnetic field $H_c(T)$ limits the current which can be passed through the superconductor without destroying the superconductive state.

The magnetic field at the surface of a cylindrical conductor, due to the current flowing therethrough, is equal to $2I_c/10r$, where $r$ is the radius of the wire in centimeters and $I_c$ is the critical current corresponding to the critical field $H_c(T)$.

With respect to curves 10 and 11 (FIG. 1) note that when the system is operating at approximately 4° K., for example, the critical field $H_c(T)$, sufficient to render a lead conductor normal (curve 10), is insufficient to render a niobium conductor normal. From the plot of FIG. 1, it is obvious that the critical field for niobium at 4° K. is many times larger than the critical field for lead. Thus it is clear that several superconducting elements being operated in the same vicinity are responsive to different field strengths so that the state of one superconductive element can be controlled by the magnetic field in the vicinity without affecting the state of other nearby conductors having a higher critical field. Where the superconductive material such as lead, for example, is utilized in the vicinity of another material, such as, niobium, and the respective materials have radically different critical fields, the material having the lower critical field is referred to as a "soft" superconductor, whereas the material having the greater critical field is referred to as a "hard" superconductor.

While FIG. 1 only illustrates the transition curves for lead, niobium, and tantalum, a similar curve can be plotted for any superconductive material. The nature of tin, for example, is such that a plot of its transition curve would appear beneath curve 10 of FIG. 1. When it is desired to obtain a material having a critical field intermediate, a first material such as tin, for example, and a second material such as lead, for example, a homogeneous alloy of the two materials may often be used in order to provide a material having the desired intermediate critical field value.

Under certain conditions it is desirable that a superconductive material, when rendered normal, exhibit a high normal resistance. A higher resistance can be obtained by plating a superconductive material such as lead, for example, onto a graphited plastic base. The increased resistivity appears only when the material is normalized, and is shorted when it becomes superconductive.

It is known that when a magnetic flux links a loop of material at the time that said material passes from its normal to its superconductive state and the flux is later removed, a current is induced in the loop which thereafter persists and continues to circulate therein. Such a current is known as a persistent current. A persistent current will circulate in a superconducting loop until a portion of the loop is rendered normal whereby the normal resistance of the normalized portion is introduced into the loop. A persistent current is dissipated in the normal resistance referred to above.

In the following description, the term "STORE interval" is used to refer to a time interval during which the presence or absence of a persistent current may be selectively stored in a superconducting loop. The term "READ interval" is used to refer to a time interval during which the presence or absence of a persistent current in a superconducting loop is detected.

Further information concerning superconductive materials, theories of superconductivity and a synopsis of the experiments performed to date on superconductive materials may be found in the following: D. Schoenberg, "Superconductivity," Second Edition, The Syndics of the Cambridge University Press, London, England (1952); M. Von Laue, "Theory of Superconductivity," Academic Press Inc., New York, New York (1952); and D. A. Buck, "The Cryotron—A Superconductive Computer Component," Proceedings of the I.R.E., vol. 44, No. 4, pp. 482–493, April 1956. These references also include further references to literature relating to methods of obtaining operating temperatures near 0° K. by apparatus utilizing liquid helium.

Figure 2:
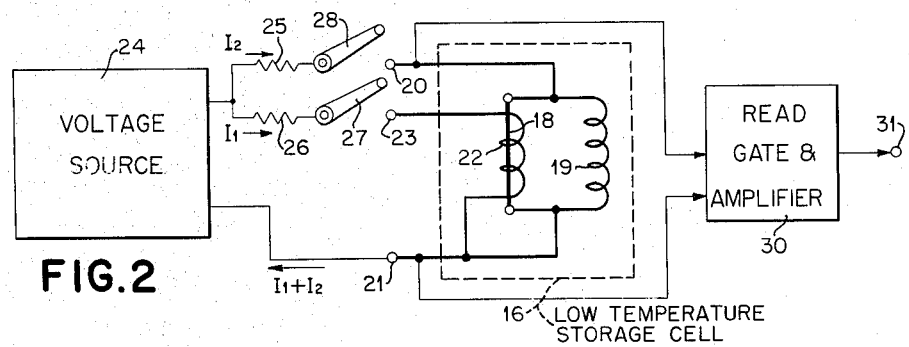
FIG. 2 is a circuit diagram of a superconductive storage loop for storing a persistent current.

Referring more particularly to FIG. 2, a novel circuit for inducing and storing a persistent current in a superconducting loop is illustrated. All of the components shown within the dashed rectangle 16 of FIG. 2 are maintained at a temperature corresponding to temperature T, for example, of FIG. 1. The temperature at which these elements must be maintained is dependent upon the superconductive materials utilized, and may be in the range of 2° K. to 5° K.

The superconductive storage loop of FIG. 2 comprises a conductor 18 and an inductance 19 connected in parallel between terminals 20 and 21. Conductor 18 is fabricated from a superconductive material having a relatively smaller critical field than the critical field associated with the superconductive material from which inductance 19 is fabricated. If preferred, conductor 18 and inductance 19 may be fabricated from materials having similar critical fields, in which case they must be physically separated so that a magnetic field applied to one does not affect the other. As explained hereinbelow, the inductance 19 always remains superconductive, whereas conductor 18 will be shifted between its normal and its superconductive state. An inductance 22 surrounds conductor 18 and may be fabricated from a superconductive material having a relatively high critical field as compared with conductor 18. However, it is not essential to the invention that this inductor be superconductive. Inductance 22 is connected between terminals 23 and 21. Inductance 22, like inductance 19, always remains in the superconductive state.

A voltage source 24 is connected to supply a current between terminal 21 and resistors 25 and 26 which are respectively connected between the source 24 and switches 28 and 27.

A read gate and amplifier circuit 30 is provided which receives the voltage signals developed between terminals 20 and 21. The output of the read circuit is connected to terminal 31. The read circuit 30 is gated so as to amplify any voltage signal appearing at terminals 20 and 21 during a READ interval.

Briefly, the switches 27 and 28 of FIG. 2 are actuated in the proper sequence to induce a persistent current in the loop comprising conductor 18 and inductance 19. After a persistant current is induced in the loop, the current continues to circulate therein without the application of electrical energy from an external source. The persistent current will continue to circulate in the loop indefinitely or until some portion of the loop, such as conductor 18, is rendered normal for a period of time sufficient to permit the current to be dissipated in the normal resistance of the conductor. The conductive state of conductor 18 is controlled by the magnetic field surrounding inductance 22. For example, when a current is flowing through inductance 22, having a value sufficient to create a field greater than the critical field of conductor 18, the latter is rendered normal. Upon the removal of this field, conductor 18 reverts to the superconductive state. The current applied to the inductances 22 and 19 of FIG. 2 must be limited so that the fields created about the inductances do not render the inductances themselves normal, but rather permit the inductances to always remain in the superconductive state.

The material comprising conductor 18 may be selected to have a lower critical field than the material comprising inductances 19 and 22. Thus conductor 18 may be fabricated, for example, of lead or tantalum and the remaining conductors within rectangle 16 of FIG. 2 may be composed of niobium. However, there are many materials such as vanadium, aluminum, tin, titanium, and alloys thereof to name only a few, which exhibit superconductive properties and may be used for the superconductive elements of FIG. 2.

Consider for example, that all the conductors within the rectangle 16 of FIG. 2 are in their superconductive states. If switch 27 is closed, a current $I_1$ supplied by voltage source 24 is applied through the switch to terminal 23, through inductance 22 to terminal 21 and returns to the generator 24. Current $I_1$ applied to inductance 22 must be sufficient to produce a magnetic field within the inductance having a magnitude greater than $H_c(T)$ so as to destroy the superconductive state of conductor 18. Hence, whenever switch 27 is closed, conductor 18 is made normal.

If, while switch 27 remains closed, switch 28 is closed, current $I_2$ is applied via terminal 20 to the parallel combination of conductor 18 and inductance 19. This current returns via terminal 21 to voltage source 24. Current $I_2$ flows entirely through the superconducting inductance 19 since the inductance has no resistance, whereas conductor 18 is now exhibiting its normal resistance due to the magnetic field created by inductance 22. Several settling times must transpire before the current is flowing entirely through the inductance 19.

Switch 27 is now opened causing the field within inductance 22 to collapse, thus rendering conductor 18 superconductive. The current $I_2$ continues to flow through inductance 19 even though conductor 18 is now superconductive. Thereafter, switch 28 is opened and the current in inductance 19 attempts to decrease. The energy stored in the inductance forces the current flowing therein to flow through conductor 18. Since conductor 18 is now superconducting, the current flowing in inductance 19 begins to circulate as a persistent current in the storage loop comprising inductance 19 and conductor 18. The persistent current induced in the loop is proportional to the magnitude of the current flowing through inductance 19 and, where the inductance of inductor 19 is many times greater than the inductance of conductor 18, is very nearly equal to it.

The induced persistant current circulates in the storage loop without the further application of current thereto. This persistent current will continue to circulate for several years without any appreciable change in magnitude, providing the superconductive loop is maintained at the proper temperature and is not subjected to an external magnetic field greater than the critical field of any of the components of the loop.

The persistent current circulating within the storage loop can be destroyed by closing switch 27 for several settling times. The closure of switch 27 establishes a magnetic field within inductance 22 which destroys the superconductive state of conductor 18. The persistent supercurrent is then dissipated by the normal resistance of conductor 18.

In certain applications, as where the storage cell is utilized as a memory device, for example, it is desirable to sense the existance of a persistent current in the storage cell of FIG. 2. During a READ operation, switch 28 remains open. The closure of switch 27 causes a current to flow through inductance 22, thereby applying a magnetic field to conductor 18. The superconductivity of conductor 18 is destroyed by the magnetic field, and the conductor exhibits its normal resistance. The persistent current circulating through inductance 19 and conductor 18 decreases when it encounters the normal resistance R of conductor 18. The current through conductor 18 produces a voltage signal between terminals 20 and 21. This signal is gated and amplified by the read gate and amplifier circuit 30 of FIG. 2 and appears at output terminal 31. The read-out signal appearing at terminal 31 can be applied to any suitable circuitry, such as the read-in circuits of a digital computer.

It is to be appreciated that the switches 27 and 28 of FIG. 2 are merely symbolic, and normally comprise electronic or superconductive switching means.

One of the advantages of the invention is that the storage of information as persistent currents may be of a permanent nature. In a computer which utilizes the invention, for example, the stored information is not lost when the power supplies fail. Also, in a very large memory it is impractical to regenerate periodically. Further, the persistent current type storage cell is easily constructed and economically operated. The circuit of FIG. 2 may also be used in an analog type computer and in other storage and control applications, since the persistent current induced in the storage loop is proportional to the field about inductance 19. That is, the circuit may be used to store the magnitude of a current.

It should be stressed that once information is stored as a persistent current in a superconductive loop, the information is continuously stored as long as the entire loop remains superconductive. Thus, in order to destroy the stored information, at least a portion of the superconductive loop must be rendered non-superconductive for several settling times. Such a loop can be rendered non-superconductive by raising the temperature above the transition temperature, or by applying thereto a magnetic field greater than the critical field.

Figure 3:
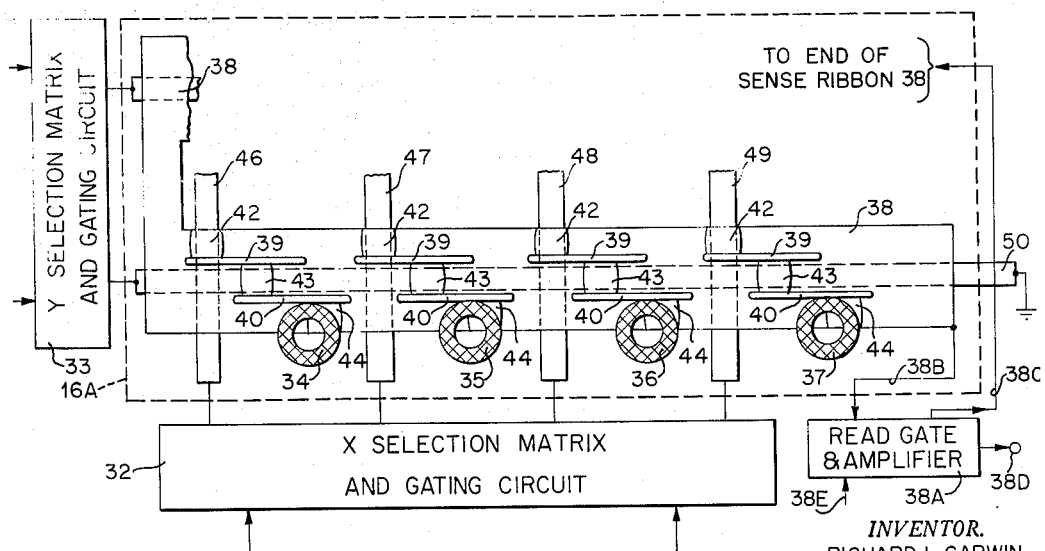
FIG. 3 illustrates a non-destructive read-out system for sensing stored persistent currents.

A system affording non-destructive read-out of a matrix or memory plane comprising a plurality of superconductive storage loops or cells, is illustrated in FIG. 3. The circuit shown may be utilized with the storage loops of FIG. 2 or with one of the thin film types described hereinbelow and shown in FIGS. 4–7A. With respect to FIG. 3, it is assumed that persistent currents have been induced in one or more of the storage loops 34–37 prior to a READ interval. The storage loops are arranged in an XY coordinate matrix, a single Y row and four X columns of which are shown in FIG. 3.

The storage cells 34–37 of FIG. 3 each comprise a loop of superconductive material adjacent to the lower portion of a sense ribbon 38. The sense ribbon 38 is composed of a thin layer of film of superconductive material having a very large critical field value so that it always remains superconductive. The sense ribbon contains a plurality of apertures 39 and 40 which may extend through the depth of the ribbon or may simply be insulating material which does not exhibit superconductive properties.

Sense ribbon 38 is also provided with a plurality of insets 42 located at appropriate intervals in the top one-third of the sense ribbon. Each of the insets 43 is located beneath and to the right of each of the corresponding insets 42. A third group of insets 44 are provided which are located at appropriate intervals across the lower one-third of the sense ribbon 38. The insets 44 are located beneath the corresponding insets 43 and to the right thereof.

Each of the insets 42, 43 and 44 extend the entire depth of sense ribbon 38 and each is composed of a thin layer or film, of a superconductive material approximately $10^{-5}$ to $10^{-3}$ centimeters thick. The insets must have a critical field value substantially smaller than sense ribbon 38, so that a particular inset may be rendered normal by a magnetic field applied thereto without destroying the superconductivity of the surrounding area of the sense ribbon.

Briefly, there is associated with each of the storage cells 34–37 a single group of insets 42–44. The insets 42 are utilized in selecting the X coordinate of an XY storage plane, the insets 43 aid in selecting the Y coordinate, and the insets 44 are used to sense the presence of a field created by a persistent current stored in the selected storage loop.

It should be noted that the insets 42–44, in conjunction with apertures 39 and 40, associated with each storage loop are traversely arranged in sense ribbon 38 so that an electrical current flowing longitudinally through the ribbon must pass through one or more of these insets. For example, if insets 42 and 43 associated with loop 36 are made normal and inset 44 is superconductive, a current applied to ribbon 38 flows through inset 44. The current path is through inset 44 because the resistance thereof is zero whereas in the assumed example, insets 42 and 43 each exhibit the normal resistance of the material. As a further example, if all three of the insets 42–44 (adjacent loop 36) are made normal their resistance is inserted in series with sense ribbon 38, and a current flowing in the ribbon produces a voltage drop across the normal resistance of the insets. It is explained hereinbelow that the occurrence of a voltage drop across the sense ribbon indicates that a persistent current is being stored in the selected storage loop.

The extremities of sense ribbon 38 are connected to a read gate and amplifier circuit 38A (FIG. 3) via conductors 38B and 38C. The output of read circuit 38A is connected to terminal 38D. During a READ interval, a gating signal applied to input 38E energizes read circuit 38A which senses and amplifies a voltage signal appearing between conductors 38B and 38C. Hence, if the storage loop selected during a READ interval is storing a persistent current a voltage pulse appears on output terminal 38D; but no output pulse appears on terminal 38D if the selected loop does not have a persistent current therein.

The read circuit 38A may be any known conventional design capable of sensing a voltage signal or a change in the resistance of the sense ribbon 38.

Disposed adjacent to each of the insets 42 of FIG. 3 is a column-select conductor or ribbon such as conductors 46–49. The column-select conductors are used to select the X coordinate of the address of the desired storage cell. Each of the conductors 46–49 comprises a thin film or layer of a superconductive material having a relatively large critical field value. These conductors always remain in the superconductive state. Conductors 46–49 are each connected between ground and the X selection matrix and gating circuit 32. The purpose of the X selection circuit 32 is to convert externally applied address selection signals to a current which is applied to the proper column-select conductor.

A row-select conductor 50 is disposed longitudinally adjacent the insets 43 which are located in the center one-third of sense ribbon 38. A row-select conductor such as conductor 50 is provided for each row of a storage matrix and is used to select the Y coordinate of the address of the storage cell to be selected. The row-select conductors are each composed of a superconductive material having a relatively large critical field and always remain in the superconductive state. The outputs of the Y selection matrix and gating circuit 33 of FIG. 3 are each connected through a row-select conductor to ground. Signals indicative of the address of a particular storage cell are applied to the Y selection circuit 33 which energizes the appropriate Y-select conductor by applying a current thereto.

The X and Y selection circuits 32 and 33 may comprise a diode matrix circuit of the type generally found in digital computers for selecting a given address in a storage or memory device. The X and Y selection circuits respectively apply currents to the appropriate column and row-select conductors corresponding to the selected address. The current through a particular select conductor creates a magnetic field greater than the value of the critical field of the inset (42 or 43) adjacent thereto and thus renders the insets normal. At the selected address both of the insets 42 and 43 will be made normal, whereas at every other address only one of the pair of insets is normal. As stated hereinabove, if the selected storage cell has a persistent current flowing therein, all three of the insets 42–44 will be in their normal states during a READ interval.

The method of reading out information from the storage matrix of FIG. 3 will be described by asuming that a bit of information is stored in storage loop 36 as a persistent current. The persistent current circulating in storage loop 36 creates a magnetic field which renders the superconductive inset 44 normal (associated with loop 36).

The row of storage cells including loop 36 is selected by applying a current to a row-select conductor 50. The current through select conductor 50 generates a magnetic field which destroys the superconductivity of each of the insets 43 in the row.

The column of the matrix including storage cell 36, for example, is selected by the application of a current to column-select conductor 48. The current flowing through conductor 48 generates a magnetic field which is applied to all of the insets 42 in the column thus destroying the superconductive state of each.

In selecting storage loop 36 by applying currents to select conductors 48 and 50, one has rendered normal insets 42 and 43 of this position. However, only one of the insets, 42 or 43, is normalized at each of the remaining positions in the storage matrix. In other words, the coincidence of normalized insets 42 and 43 at storage cell 36 effected the selection of this cell. As stated above, the persistent current stored in storage loop 36 creates a magnetic field which normalizes inset 44. Accordingly, when a persistent current is stored in the selected storage cell, each of the insets 42, 43 and 44 exhibits its normal resistance during the READ interval. The normal resistance of insets 42–44 produces a voltage drop in the sense ribbon 38 whereupon a voltage signal is applied to read gate and amplifier 38A. The read circuit 38A amplifies the input signal and produces an output pulse at 38D which is indicative of a persistent current being stored in the selected storage position.

It should be reiterated that the row and column-select conductors and the sense ribbon, with the exclusion of all of the insets 42–44, must be formed from a superconductive material having a sufficiently high critical field value so that these components always remain in the superconductive state. Further, the magnitudes of the select currents applied to the select conductors must be sufficient to create a magnetic field greater than the critical field of the select conductors and the sense ribbon. In practice, the components contained within the dashed rectangle 16A of FIG. 3 must be maintained at a temperature within the superconductive regions of the material utilized, as for example, approximately 4° K.

An important advantage of the read-out circuit of FIG. 3 is that a non-destructive type read-out is effected since the stored persistent currents are not destroyed during a READ interval. While only a portion of a matrix is illustrated in FIG. 3, in a practical application, the matrix would include a larger number of rows and columns of storage cells. It is also to be noted that in a larger matrix, the sense ribbon 38 is continuous and is disposed adjacent to each of the cells. Where a multiplicity of storage planes is provided in order to store a plurality of bits of information comprising a word or a number, an individual sense ribbon is included with each plane. In the latter instance, further select conductors and associated insets may be added to thereby increase the selection dimensions of the system.

The discussion hereinabove with respect to FIG. 3 assumes that persistent currents have previously been stored in the storage cells 34–37 prior to the read-out operation. The following description sets forth various embodiments in which a persistent current can be induced and thereafter stored.

Referring more particularly to FIG. 4, an embodiment of the invention for inducing a persistent current in a superconductive storage cell is illustrated. The storage cell comprises a ring or loop 51 of a superconductive material preferably in the form of a thin film or sheet. The loop 51 may, for example, comprise a film of lead or tantalum deposited by vacuum metalizing techniques. A horizontal-select conductor 52 is placed over storage loop 51 at a predetermined location between the center hole and the outside perimeter of the loop. A vertical-select conductor 53 is also placed over the storage cell 51 and is oriented symmetrically to horizontal-select conductor 52. Select conductors 52 and 53 are arranged symmetrically with respect to the axis of the hole. A conductor 54 is arranged in one or more turns around the periphery of loop 51 and provides a main field which is instrumental in inducing a persistent current in superconductive loop 51.

During a STORE interval, a current $I_1$ is applied to conductor 52 which flows from left to right in FIG. 4 and a current $I_2$ is applied to conductor 53 which flows upwards. The magnetic fields produced by currents $I_1$ and $I_2$ individually must each be less than the critical field value of the superconductive material comprising loop 51. However, the coincidence of currents $I_1$ and $I_2$ produces a resultant magnetic field greater than the critical field of superconductive loop 51.

Immediately beneath the point 51A at which conductors 52 and 53 cross, the fields produced by currents $I_1$ and $I_2$ are additive to create a resultant field which renders a portion of loop 51 normal. The resistance of this normalized portion of loop 51 dissipates any persistent current previously circulating therein. At the termination of a STORE interval, currents $I_1$ and $I_2$ are removed, thus permitting the normalized portion of loop 51 to return to the superconductive state. After the entire loop resumes the superconductive state, a persistent current may or may not be induced in the loop, dependent upon the presence or absence of flux in the center of the loop.

It is known that when a net magnetic flux is suddenly applied through the center of a conductive loop and at right angles to the plane thereof, a current proportional to the magnitude of the field, is induced in the loop. It follows therefore, that when a net flux through the center of the loop was zero, a current is not induced therein. Note that the net flux flowing through the center of a loop is zero when two fields of equal and opposite magnitudes are applied through the loop. Note also that in the general case, a current induced in a conductive loop is dissipated by the resistance of the loop. With these principles in mind, the induction of a persistent current in a superconductive loop is described.

The currents $I_1$ and $I_2$ flowing in the horizontal and vertical-select conductors 52 and 53 each create a magnetic field about the conductors in the directions illustrated by the arrows of FIG. 4. The fields created by currents $I_1$ and $I_2$ are additive to form a resultant field in the upper left-hand and lower right-hand quadrants formed by conductors 52 and 53. However, in the lower left-hand quadrant, the fields are subtractive so as to provide zero field on a diagonal line extending from the point 51A at which conductors 52 and 53 cross in a direction downward and to the left at an angle of 45°. In FIG. 4, the flux above the zero field line is travelling into the paper while the flux below this line travels in the opposite direction. Thus, in the lower left-hand quadrant, the net flux flowing through the center hole of loop 51, due to currents $I_1$ and $I_2$, is zero. It is clear therefore, that a persistent current cannot be induced in loop 51 by the fields produced by currents $I_1$ and $I_2$.

If, at the time the portion 51A beneath both conductors 52 and 53 returns from its normal to its superconductive state, the net flux passing through the center of the loop is zero, a persistent current will not be stored in the loop. If, however, when said segment of loop 51 returns from its normal to its superconductive state, a net flux is passing through the center of loop 51, a current will be induced in the surface of the loop which is proportional to the magnitude of the field through the loop upon the removal of the flux. Since the resistance of loop 51 is zero in the superconductive state, the current induced therein persists and thus circulates as long as the loop remains superconductive.

With respect to FIG. 4, the flux required to link the center of storage loop 51 in order to induce a persistent current therein during a WRITE interval, is provided by the main field winding 54. The application of a current $I_3$ to the main field winding 54 createst a magnetic field which flows into the paper through the center of loop 51. The value of the current $I_3$ is limited so that this magnetic field is of itself below the intensity required to shift the material of loop 51 from a superconductive to a normal state. It is immaterial whether the current $I_3$ is applied to the main field winding 54 so as to create a clockwise or counterclockwise field.

A binary 0 or a binary 1 is stored in the storage loop of FIG. 4 by applying currents $I_1$, $I_2$ and $I_3$ in the proper sequence. For example, when a binary 0 is to be stored in the loop as represented by the absence of a persistent current, the flux produced by the main field current $I_3$ must not be present at the time the portion 51A of the loop returns from its normal to its superconductive state (when $I_1$ and $I_2$ are turned off). In order to store a binary 1 in the loop as represented by a persistent current, the main field flux passing through the center of the loop must be turned off after the time that portion 51A thereof passes from its normal to its superconductive state. The changing flux induces a current in the loop.

Referring briefly to FIG. 4A, a binary 0 (absence of a persistent current) is stored in the loop by causing currents $I_1$ and $I_2$ to be turned on at the beginning of a WRITE interval and turned off at the end thereof. Depending upon the circuitry used to gate currents $I_1$, $I_2$ and $I_3$, the current $I_3$ must remain off throughout the WRITE interval, or in the event that it is turned on, it must be turned off prior to the time that currents $I_1$ and $I_2$ are turned off. The latter situation is illustrated by the dashed waveform $I_3$ in FIG. 4A.

Referring to FIG. 4B, a binary 1 is stored in loop 51 of FIG. 4 by requiring that current $I_3$ which produces the main field flux remain on after the currents $I_1$ and $I_2$ are turned off. By turning off currents $I_1$ and $I_2$ prior to $I_3$, the main field flux is passing through the center of loop 51 at the time that it returns to the superconductive state, thereby inducing a current in the loop upon the removal of $I_3$, which persists since the resistance of the loop 51 is now zero.

Referring more particularly to FIG. 5, a second embodiment of the invention for inducting a persistent current in a superconductive storage loop is illustrated. In FIG. 5, the horizontal and vertical-select conductors 55 and 56 are arranged to pass through the center hole of the superconductive storage cell 51B. The currents $I_1$ and $I_2$ are respectively applied to select-conductors 55 and 56 so as to flow in the same direction at the point where these conductors pass through the center hole. Hence, currents $I_1$ and $I_2$ create a resultant magnetic field having flux lines parallel to the plane of the store loop 51B. Here again, the individual fields created by currents $I_1$ and $I_2$ each have a field strength less than the critical magnetic field of superconductive loop 51B. However, the resultant field created by the coincidence of currents $I_1$ and $I_2$, is sufficient to render the entire storage loop 51B normal. In FIG. 5, the main field is produced by current $I_3$ flowing through the main field winding 54 which is oriented similarly to the main field winding illustrated in FIG. 4.

A persistent current is induced in the storage loop of FIG. 5 in the same manner as described with respect to FIG. 4. That is, a persistent current is induced in the loop 51B by causing the currents $I_1$ and $I_2$ to be turned off prior to the turning off of current $I_3$. As stated above, this causes the main field flux to link the center hole of storage loop 51B during the time that the loop is transformed from its normal to its superconductive state thereby inducing a current when $I_3$ is removed. However, a persistent current is not induced in storage loop 51B if the main field created by current $I_3$ is off prior to the cessation of currents $I_1$ and $I_2$. In the latter case, there is no net flux passing through the center hole of loop 51B. The waveforms of FIGS. 4A and 4B also apply to FIG. 5.

In FIG. 5, note that the net flux through the center hole of loop 51B, due to the field produced by currents $I_1$ and $I_2$ is zero. Therefore, this field is ineffective to induce a current in loop 51B.

A further embodiment of the invention for inducing a persistent current in a superconductive storage cell is illustrated in FIG. 6. Horizontal-select conductor 57 of FIG. 6 is disposed adjacent a diameter of superconductive storage loop 51C thereby passing over the center hole thereof. Vertical-select conductor 58 is arranged so that a portion thereof traverses a diameter of loop 51C in the same manner as conductor 57. As illustrated in FIG. 6, the horizontal portion of the vertical select conductor 58 is placed directly over horizontal select conductor 57. The main field winding 54 of FIG. 6 surrounds the superconductive storage cell 51C in the manner described hereinabove with respect to FIGS. 4 and 5.

When the currents $I_1$ and $I_2$ of FIG. 6 are simultaneously applied to the respective conductors 57 and 58, a resultant field is produced which normalizes the portions of loop 51C located beneath the select conductors during a STORE interval. As stated above, the normalized portions of the loop dissipate any persistent current therein. Currents $I_1$ and $I_2$ are arranged to pass through the conductors 57 and 58 in the same direction over storage cell 51C. Accordingly, the individual magnetic fields created by these currents are additive so as to produce a stronger resultant field. The field produced by either current along is less than the critical field of the storage loop. Note also that the net flux through the center of the loop, due to currents $I_1$ and $I_2$, is zero.

The storing of a binary 1 or binary 0 is effected by controlling current $I_3$ in the main field winding 54. That is, a persistent current is induced in the storage loop 51 by removing the main field only after the resultant field produced by currents $I_1$ and $I_2$ is turned off (see FIG. 4B). Accordingly, the main-field flux is penetrating the center hole of loop 51C at the time that the latter passes from the normal to the superconductive state. A binary 0 (the absence of a persistent current) is stored in the storage loop of FIG. 6 by causing the main field to be turned off prior to the shutting off of currents $I_1$ and $I_2$. Under this condition, a magnetic field is not linking storage loop 51 at the time that the cell passes from the normal to the superconductive state.

Referring more particularly to FIGS. 7A and 7B, another embodiment of the invention for inducing a persistent current in a superconductive storage loop is illustrated. The embodiment of FIGS. 7A and 7B eliminate the requirement of the main field which was produced in FIGS. 4, 5 and 6 by the current $I_3$ flowing through winding 54.

In FIG. 7A, the horizontal-select conductor 59 and the vertical-select conductor 60 are oriented orthogonally and are utilized to control the application of a magnetic field to the storage loop 61. Storage loop 61 is sandwiched between select conductors 59 and 60.

Referring to FIG. 7B, the superconductive storage loop 61 is composed of two materials exhibiting superconductive properties which are arranged to form a continuous loop. The inset 62 of FIG. 7B is formed of a superconductive material having a lower critical field value than the remaining portion 63 of the loop. The superconductive material 62 is chosen to have a critical field value such that the material is rendered normal by the field produced by the coincidence of currents flowing in the horizontal and vertical-select conductors. The material 63 comprising the major portion of the storage loop is chosen to have sufficiently high critical field so that it always remains superconductive when coincident currents occur in the select conductors.

Regardless of the direction of current flow through the select conductors, inset 62 of the storage loop 61 is rendered normal whenever a coincidence of currents having proper magnitudes are flowing through the horizontal and vertical select conductors. The normal resistance of inset 62 serves to dissipate any persistent current previously circulating in loop 61. The magnitude of the current applied to either the horizontal or the vertical select conductor is chosen to produce a magnetic field which, by itself, is incapable of normalizing the inset 62.

The left-hand leg of storage loop 61 (FIG. 7B) is substantially narrower than the top and right-hand leg which include inset 62. The width of the top and right-hand legs is determined by the field in inset 62 created by a persistent current circulating in the loop. That is, by increasing the width of a leg, the flux density decreases nearby and thus this width may be adjusted so that the flux density of the field created by a persistent current is always insufficient to render inset 62 normal. As stated above, inset 62 should be made normal only by the coincidence of select currents in conductors 59 and 60 of FIG. 7A.

The reason that the width of the left-hand leg of loop 61 is substantially smaller than the remaining legs, is to provide an increased field created by a persistent current wherein said field surrounds only the left-hand leg. The larger field about the left-hand leg, due to a persistent current circulating in the loop, is utilized to render normal a sense inset incorporated in a sense ribbon in much the same manner that storage loop 36, for example, of FIG. 3 rendered normal the sense inset 44. This feature is explained hereinbelow with respect to FIG. 10.

In FIG. 7B, it is indicated that inset 62 is disposed as a section of loop 61. FIG. 7C illustrates another method of fabricating the inset 62. In FIG. 7C, the inset 62A is formed by bonding a thin strip of superconductive material between two ends of the loop 61. The inset 62A follows the contour of the opening provided for the inset and may be fabricated by depositing a thin layer of superconductive material so as to overlap the ends of loop 61.

A binary 1, represented by a persistent current, is read into storage loop 61 of FIG. 7A by applying current $I_1$ to horizontal select conductor 59 from left to right and applying current $I_2$ to vertical select conductor 60 to flow downwards as depicted in the diagram of FIG. 8A.

When currents $I_1$ and $I_2$ are flowing in the directions indicated in FIG. 8A, a resultant magnetic field is formed immediately beneath the point at which the conductors cross which renders inset 62 normal. The normalization of inset 62 introduces its resistance which dissipates any persistent current previously circulating in the loop. The resultant field produced under the above circumstances is additive in the lower left-hand and upper right-hand quadrants formed by conductors 59 and 60 and is subtractive in the upper left-hand and lower right-hand quadrants. Since the fields produced by currents $I_1$ and $I_2$ are additive in the lower left-hand quadrant, the resultant field provides a net flux flowing through the center opening of loop 61. Accordingly, at the termination of a STORE interval, the normalized inset 62 returns to the superconductive state when currents $I_1$ and $I_2$ are turned off. Since a net flux is present in the center opening of loop 61 when the entire loop becomes superconducting again, a current is induced in the loop which persists as long as the loop remains entirely superconducting. The current induced in the loop is proportional to the magnitude of the net flux passing through the center opening thereof.

In order to store a binary 0, as represented by the absence of a persistent current in loop 61, current $I_1$ flows from left to right in conductor 59 and current $I_2$ must flow upwards through conductor 60 as depicted in FIG. 8B. The coincidence of currents $I_1$ and $I_2$ produces a resultant field which normalizes inset 62 as explained above to thereby dissipate any previously existing persistent current. However, since current $I_2$ is reversed in FIG. 8B, the resultant magnetic field is produced by additive fields (due to currents $I_1$ and $I_2$) in the upper left-hand and lower right-hand quadrants. The fields are subtractive in the lower left-hand and upper right-hand quadrants so that there is no net flux flowing through the center opening of loop 61.

Hence, a persistent current is not induced in loop 61 when currents $I_1$ and $I_2$ are flowing in the directions indicated in FIG. 8B since there is no net flux through the center opening of loop 61 at the time that the loop becomes entirely superconductive as $I_1$ and $I_2$ turned off.

The directions of the currents $I_1$ and $I_2$ indicated in FIG. 8A and 8B have been chosen arbitrarily and it should be noted that a persistent current may be induced in the storage cell of FIG. 7A by reversing the direction of both of the currents indicated in FIG. 8A and that the absence of a persistent current may be stored by reversing the directions of both of the currents indicated in FIG. 8B.

If desired inset 62 of FIG. 7B–7C may be eliminated and the entire loop be composed of the same material. The operation of the loop to store a persistent current, in this case, is as described above. Here the portion of the loop beneath the select conductors is normalized by the coincident fields in the same manner as inset 62 is normalized.

It is now apparent that in the embodiment of FIG. 7A, the selective writing of a binary 1 or a binary 0 in a storage cell is effected by controlling the direction of the currents flowing in the horizontal and vertical-select conductors, and the necessity for the main field required in FIGS. 4–6 has been eliminated.

While the description hereinabove of FIGS. 4–7A treat only a single storage position, it is apparent that a storage matrix comprising a plurality of storage positions may be fabricated utilizing any of these embodiments. Briefly, a particular storage position of a multi-position storage matrix is selected by applying currents to the appropriate horizontal and vertical-select conductors. In a storage matrix involving any of the embodiments of FIGS. 4–7A, a sense ribbon similar to the sense ribbon 38 of FIG. 3 may be utilized in conjunction therewith.

Referring more particularly to FIG. 9, a two-by-three storage matrix or memory plane utilizing the embodiment of FIG. 4 is illustrated. In FIG. 9, a storage position is associated with each of the superconductive storage loops 70–75. The sense ribbon 78 is continuous and is arranged to be adjacent to each of the storage loops of the matrix.

The sense ribbon 78 is composed of a superconductive material and is provided with a pair of apertures similar to apertures 79 and 80 at *each* of the storage positions. The apertures 79 and 80 serve to divide the sense ribbon into three superconductive areas designated as 81, 82 and 83. It is to be understood that in place of the apertures 79 and 80, there may be substituted a material which does not possess superconductive characteristics. A particular storage position of the matrix is selected during a READ interval by causing the superconductive areas 81 and 82 to be respectively rendered non-superconductive by currents flowing through the appropriate horizontal and vertical select conductors. The superconductive area 83 is rendered non-superconductive only if the associated storage loop, such as 70, is storing a persistent current. Accordingly, if storage loop 70, for example, is storing a persistent current and this storage position is selected, each of the areas 81–83 are rendered non-superconductive so that the normal resistance of these areas is inserted in series with the remaining portion of the sense ribbon 78. Thus, if a sensing current is flowing through the sense ribbon, the appearance of the normal resistance of the areas 81–83, causes a voltage drop to appear between the ends of the sense ribbon. The occurrence of such a voltage signal indicates the storage of a persistent current at the selected storage position.

The select conductors 86–90 are each fabricated of a superconductive material having a sufficiently high critical field so that they always remain in the superconductive state. The selected conductors, the sense ribbon and the storage loops of FIG. 9 must all be maintained at a temperature within a few degrees of absolute zero so that the material comprising these units are capable of exhibiting their superconductive properties.

There are provided in FIG. 9, horizontal-select conductors 86, 87 and 88 and vertical-select conductors 89 and 90 which are utilized only during a READ interval, It is noted that horizontal-select conductor 88, for example, passes through the superconductive area 81 of the sense ribbon associated with each of the storage positions in the upper horizontal row. Similarly, horizontal-select conductor 87 passes through the superconductive area 81 associated with each of the storage positions in the center horizontal row, and conductor 86 passes through similar areas in the lower horizontal row. The vertical-select conductor 89 is arranged to pass through the superconductive area 82 of the sense ribbon associated with each of the storage locations in the left-hand vertical column of FIG. 9. In a like manner, vertical-select conductor 90 passes through the area 82 of each of the storage positions associated with the right-hand vertical column.

The information stored in storage loop 70, for example, is sensed by applying currents to select conductors 88 and 89 and by failing to supply currents to the remaining select conductors of the storage matrix. The selection of the appropriate horizontal-select conductor during a read-out operation is accomplished by the Y selection matrix and gating circuit 92 of FIG. 9. Each of the horizontal-select conductors is connected between ground and the Y selection circuit 92. Similarly, the vertical-select conductors are each connected between ground and the X selection matrix and gating circuit 93. The X and Y selection circuits 92 and 93 may comprise any well-known logical matrix circuit such as a diode gating matrix which receives the proper selection potentials from external circuitry (not illustrated in FIG. 9). The circuits 92 and 93 also include the appropriate current generators for supplying the appropriate currents to the select conductors.

The two extremities of the superconductive sense ribbon 78 are connected by conductors 95 and 96 to the read gate and amplifier 97. The purpose of the read gate and amplifier is to apply a current to the sense ribbon during each read-out operation and to detect a voltage drop or signal across the ribbon during the selection of a particular storage location. If a persistent current is stored in the selected storage location, a voltage pulse appears at the output terminal 98. However, if the selected storage location is not storing a persistent current, a voltage signal does not appear at terminal 98. The input 99 of the read gate amplifier 97 must be connected to external circuitry which provides a signal designating that a READ operation is to be performed.

As stated above, the select conductors 88–90 are utilized during a read-out operation. During a STORE operation, select conductors 101–105 are utilized. These select conductors are arranged adjacent to the surface of the storage loops 70–75 in the manner described with respect to FIG. 4. Horizontal-select conductor 101, for example, is energized when the lower horizontal row of FIG. 9 is to be selected. Similarly, vertical-select conductor 104, for example, carries a current when the left-hand vertical column of FIG. 9 is selected. Each of the select conductors 101–105 is composed of a material having superconductive characteristics similar to the material used to fabricate select conductors 88–90.

Each of the horizontal select conductors 101–103 is connected between ground and the Y' selection matrix and gating circuit 106. Vertical select conductors 104 and 105 are each connected between ground and the X' selection matrix and gating circuit 107. The selection and gating circuits 106 and 107 are similar to the circuits 92 and 93 and must be provided with external selection signals which determine the address of the desired storage location.

The main field winding of each of the storage locations of FIG. 9 is provided by conductor 110 which encompasses each of the storage loops 70–75. The main field windings of each of the storage positions are connected in series and to the main field gating circuit 111. The purpose of the main field gating circuit 111 is to supply a current through the main field windings during the appropriate portion of a STORE interval. The duration of the current producing the main field is controlled by the time duration of the signal applied to input 112 of the main field gating circuit 111.

In order to store a binary 1 in storage loop 73, for example, the selection and gating circuits 106 and 107 cause currents to be applied to horizontal-select conductor 102 and vertical-select conductor 105. Simultaneously therewith, the main field gating circuit supplies a current to the main field winding 110. The initial application of currents to select conductors 102 and 105 renders the storage loop 73 normal so as to dissipate a persistent current previously stored therein. In order to induce a new persistent current in storage loop 73, the main field must remain on after the currents applied to conductors 102 and 105 are turned off. As explained above with respect to FIG. 4, the fact that the flux of the main field is linking the center hole of storage loop 73 at the time that the loop passes from its normal to its superconductive state, causes a persistent current to be induced therein upon the removal of the main field.

However, if a binary 0, as represented by the absence of a persistent current, is to be read into storage loop 73, the signal applied to input 112 of the main field gating circuit 111 must cause the current flowing through the main field winding to be turned off prior to the cessation of the currents flowing through conductors 102 and 105. Under these conditions, a persistent current is not induced in storage loop 73 due to the fact that no net flux links the hole of the storage loop when the loop passes from its normal to its superconductive state.

While FIG. 9 illustrates the embodiment of the invention shown in FIG. 4, it is apparent that a similar matrix may be constructed utilizing the embodiment of FIGS. 5, 6 or 7A.

A further embodiment of the invention is shown in FIGS. 10, 10A and 11, which illustrates a storage plane formed of six layers or films of materials. FIG. 10 is a cut-away view illustrating the orientation of the various components of layers 1 through 6 of a memory plane. FIG. 10A is a cross section of the memory plane taken at the points 10A of FIG. 10. FIG. 11 is an expanded perspective view of the layers of the memory plane. The thickness of the various layers illustrated in FIGS. 10–11 are exaggerated in order to show the construction of the memory plane. However, it is contemplated that the layers are very thin (of the order of $10^{-5}$ to $10^{-3}$ centimeters) and may, for example, be formed by depositing the layers by a vacuum metallizing technique.

Layers 1 and 6 each comprise a lead film of the order of $10^{-4}$ to $10^{-3}$ centimeters thick, for example. These layers serve to confine the flux to the width of the conductors of the memory plane. The outside layers also serve to reduce the inductance of the conductors and to shield one memory plane from another so as to eliminate electrical coupling therebetween.

Layer 1 is coated with a thin layer of insulating material 160 (FIG. 10A) which is approximately $10^{-4}$ centimeters thick and serves to insulate layer 1 from layer 2. The drawing of FIG. 11 has been simplified by omitting the insulation between layers.

Layer 2 of FIGS. 10–11 comprises a sense ribbon 161 similar to sense ribbon 38 of FIG. 3. The sense ribbon 161 may be deposited over layer 1 or may be constructed by well-known printed circuit techniques.

The sense ribbon 161 comprises a superconductive material having a relatively high critical magnetic field value as compared to insets 162, 163 and 164. The insets 162–164 have a critical value of magnetic field substantially lower than the corresponding value of the superconductive material comprising sense ribbon 161. Each of the insets 162 and 163 are separated from each other by a non-superconducting area 165 which may comprise an aperture in sense ribbon 161 or may consist of a non-superconductive substance. Similarly, each of the insets 163 and 164 are separated from area 166 which may comprise an aperture of an area of non-superconductive material.

The insets 162–164 are oriented in a slightly different manner that the corresponding insets of FIG. 3 for reasons set forth hereinbelow. Each of the insets 162 are located in the upper one-third of the sense ribbon. The insets 163 are located in the center one-third of the ribbon and the insets 164 are located in the lower one-third of the sense ribbon. Inset 163 is located beneath and to the right of inset 162, and inset 164 is located below insets 162 and 163 and to the left of inset 162.

It should be noted again that a single group of insets 162–164 is associated with each storage position. It should further be noted that the groups of insets are arranged in columns and rows so as to provide an XY coordinate storage system. In FIG. 10, there is illustrated four columns of storage positions arranged in two rows. The columns are arbitrarily designated 167, 168, 169 and 170 and the rows are designated 171 and 172. The sense ribbon 161 is associated with rows 171 and 172 and includes the superconductive link 174.

A thin layer of insulating material is deposited over layer 2 so as to insulate it from layer 3. Layer 3 contains the column-select conductors 177, 178 and 179 and 180. Column-select conductor 180 is not illustrated in the cutaway view of FIG. 10, but is illustrated as part of layer 3 in FIG. 11. Column-select conductor 177–180 are made of a superconductive material having a relatively high critical magnetic field value as compared to the corresponding value of the insets 162–164. A thin layer of insulating material is deposited over layer 3 in order to insulate it from layer 4.

Layer 4 comprises a plurality of superconductive storage loops utilized to store the induced persistent currents of the memory device. Each of the storage rings of layer 4 is identical to loop 61 of FIG. 7A. Each storage loop (FIG. 10) is oriented so that inset 181 is located immediately below the location of inset 162. The right-hand leg of each loop is oriented directly over the corresponding column-select ribbon. The left-hand leg of each storage loop is disposed adjacent inset 164 of the sense ribbon as shown in FIG. 10.

Layer 4 of FIGS. 10–11 is separated from layer 5 by a thin film of insulating material. Layer 5 comprises the row-select conductors 185 and 186 corresponding to rows 171 and 172 of FIG. 10. The row-select conductors 185 and 186 serve the same function as described hereinabove with respect to horizontal select conductor 59 of FIG. 7A. Layers 5 and 6 are again separated from each other by a thin layer of insulating material.

Information stored in one or more of the storage cells of FIGS. 10–11 is read out in a manner similar to the method described with respect to FIG. 3. Consider, for example, that a bit of information is stored in storage loop 183 of FIG. 10 by a persistent current circulating therein. The persistent current in loop 183 produces a magnetic field which is applied to inset 164 corresponding to this storage position. Inset 164 is thus rendered normal.

The column containing storage loop 183 is selected by external switching means which applies a current to column-select conductor 178. The current flowing through conductor 178 creates a magnetic field which destroys the superconductivity of inset 162. The Y coordinate or row containing loop 183 is selected by external switching means which applies a current to row select conductor 185 of FIG. 10. The current flowing through ribbon 185 produces a magnetic field which renders inset 163 normal.

The information stored in the selected storage cell is then read out by passing a current through sensing ribbon 161. As stated above, the superconductive characteristics of insets 162, 163 and 164 associated with storage loop 183 have been respectively destroyed by the currents flowing through select conductors 178, 185 and storage loop 183. Accordingly, the normal resistance of the insets is inserted in series with the superconductive sense ribbon so that a voltage drop appears thereacross. The voltage drop across the sense ribbon indicates that the selected storage loop is presently storing a persistent current. The voltage signal appearing across the sense ribbon may be gated and amplified by appropriate circuitry and thereafter applied to arithemic circuitry of a digital computer.

Information is initially stored in the storage cells of FIG. 10 by applying appropriate currents to the column and row-select conductors as described hereinabove with respect to FIG. 7A. A bit of information is read into a particular storage cell by causing external switching means (not shown) to select the appropriate column and row select conductors corresponding to the desired storage loop. The external switching means performs the function described hereinabove with respect to the X and Y selection circuits 32 and 33 of FIG. 3, and circuits 92, 93, 106 and 107 of FIG. 9.

The current applied to the row and column-select conductors during a STORE operation is generally several times larger than the current applied thereto during a READ operation. The magnitude of these currents during a READ operation is limited by and must be below the value which produces a magnetic field equal to the critical field of inset 181 of a storage loop. During a STORE operation, these currents must produce a field greater than the critical field of inset 181 as described hereinbefore with respect to FIG. 7A.

Referring more particularly to FIG. 12, an adiabatic demagnetization refrigerator incorporating the invention for controlling a thermal heat switch is illustrated. It is known that a conductor having superconductive characteristics may be utilized as a thermal heat switch wherein the normal or superconductive state of the conductor respectively passes a heat current easily or acts as a thermal insulator. Thus by placing a superconducting conductor within the inductance 19 of FIG. 2, the novel circuit of FIG. 2 may be utilized to control the thermal properties of said conductor, thereby providing a thermal heat switch. The opening or closing of the heat switch is respectively determined by whether or not a magnetic field greater or less than the critical field is applied to the conductor. The selective application of such a magnetic field may be effected by controlling a persistent current circulating in a superconducting storage cell of the type described hereinbefore.

Superconductive thermal switches are found in the prior art wherein the magnetic field used to control the superconductive element is provided by an electromagnet surrounding said element. In order to maintain the element in the thermal conducting state, a current of several amperes must be continuously supplied to the electromagnet. Accordingly, the large power requirements of the electromagnet demand that the power supplies be capable of delivering large currents for time intervals up to 100 seconds. These requirements dictate substantial and more costly power equipment. Further, considerable power is dissipated in the electromagnet.

In the novel thermal switch described herein the necessity for a sustained current to provide the required magnetic field is eliminated. A superconducting loop including an inductance is provided. The inductance is disposed adjacent the superconducting thermal element. Current pulses are utilized to induce a persistent current in the superconducting loop. Once established, the persistent current circulates in the loop without the further application of electrical energy thereto. The persistent current flowing through the inductance creates a magnetic field which renders the element thermally conductive. Since the current pulses which induce the persistent current are of less than fifty microseconds duration, the equipment necessary to produce them is less costly than the heavy-duty power supplies heretofore required. Also, there is no power dissipation in the loop, thus increasing the efficiency of the entire system.

The low temperature components of the demagnetization refrigerator are enclosed within the thermal insulating vacuum chamber 200 of FIG. 12. The container 201 of FIG. 12 serves as a constant high temperature reservoir and is generally filled with liquid helium which has a temperature of approximately 1° K. However, other substances may be used in container 201 in order to provide a different reference temperature. Container 202 is filled with a paramagnetic salt such as iron-ammonium alum or chromium potassium alum, and is referred to herein as salt pill $P_1$. The paramagnetic salt is used to perform the work accomplished in obtaining a temperature lower than the reference temperature of the reservoir 201. A paramagnetic salt is also used as a low temperature reservoir which is housed in container 203. The low temperature reservoir is referred to herein as salt pill $P_2$.

The constant-temperature reservoir 201 is coupled to the paramagnetic salt pill $P_1$ by thermal switch 204 and salt pill $P_2$ is coupled to the working substance $P_1$ by the thermal switch 205. Briefly, the paramagnetic salt pill $P_1$ which serves as the working substance is magnetically controlled to absorb heat flowing from the low temperature reservoir $P_2$, and the constant temperature reservoir 201, in turn, absorbs heat from the working substance $P_1$.

Heat switch 204 includes a thermal link 208 fabricated from a superconducting material. The link 208 may, for example, be pure lead which exhibits good thermal conductivity in the non-superconducting state. Thermal link 208 is bonded to members 209 and 210 which respectively provide a good thermal conductive path from the link to container 201 and the working substance $P_1$. A thermal insulating member 211 supports the thermal conducting members 209 and 210.

The superconductive or normal state of thermal link 208 is controlled by inductance 212 which is connected in parallel with a superconducting conductor 213. Conductor 213 may be fabricated from an alloy of tin and lead, for example, in order to reduce the critical field required to normalize the conductor. A first juncture of conductor 213 and inductance 212 is connected to terminal 214, and the second juncture of these members is connected to terminal 215. The conductor 213 is surrounded by the superconducting inductance 216 which is connected between terminals 215 and 217. A brief comparison of thermal switch 204 with the circuit of FIG. 2 indicates that terminals 214, 217 and 215 (FIG. 12) respectively correspond to terminals 20, 23 and 21 of FIG. 2.

A thermal link 220 of heat switch 205 is bonded to members 221 and 222 which respectively serve as thermal conductors between link 220, the working substance $P_1$ and reservoir $P_2$. A superconducting inductance 223 surrounds thermal link 220 and is connected in parallel with a superconductive conductor 224. The two junctures of the parallel combination of conductor 224 and inductance 223, are respectively connected to terminals 225 and 226. A further superconducting inductance 227 surrounds conductor 224 and is connected between terminals 228 and 226. The thermal conducting members 221 and 222 are supported by a thermal insulating member 230. It is to be noted that the construction of thermal switch 205 is identical with switch 204.

As stated hereinabove, thermal switch 204, for example, serves to control the flow of heat currents between working substance $P_1$ and constant temperature reservoir 201. When the thermal link 208 is rendered normal, the thermal resistance of the link is relatively low so that heat currents are permitted to pass therethrough. However, when the link 208 is in the superconductive state, it acts essentially as a thermal insulator. When a persistent current is circulating in the superconductive loop comprising inductance 212 and conductor 213, a magnetic field is created around inductance 212 which is applied to thermal link 208. This field is gerater than the critical field of link 208 and thus renders it normal so that heat currents may pass therethrough. On the other hand, if a persistent current is not circulating within the parallel combination of inductance 212 and conductor 213, the thermal link remains in its superconductive state so as to act as a thermal insulator. The manner in which a persistent current is induced in the parallel combination of inductance 212 and conductor 213, is described hereinabove with respect to FIG. 2. Thus it is seen that a persistent current circulating in a superconducting closed current path may be used to control a thermal link fabricated of superconductive material, thereby providing the functions of a thermal switch.

The work performed within the demagnetization refrigerator is effectuated by magnetizing and demagnetizing the paramagnetic salt $P_1$ constituting the working substance. The magnetic properties of the working substance are controlled by electromagnet 234 which is arranged external to vacuum chamber 200. The winding of the electromagnet is respectively connected between terminals 235 and 236.

Briefly, the cycle of operation of the adiabatic demagnetization refrigerator is as follows. Firstly, the paramagnetic salt $P_1$ is magnetized by applying a current $I_m$ to terminals 235 and 236. Secondly, a persistent current is established in thermal switch 204 so that the paramagnetic salt 202 is thermally connected to the constant temperature bah 201. The heat of magnetization created within the paramagnetic salt $P_1$ is then conducted to the constant temperature reservoir 201 through the normalized thermal link 208. Thirdly, the persistent current circulating in thermal switch 204 is destroyed so that thermal link 208 becomes superconductive thereby thermally insulating paramagnetic salt $P_1$ from the constant temperature reservoir 201. Fourthly, the current $I_m$ is decreased so that the paramagnetic salt 202 is demagnetized. Fifthly, a persistent current is established in thermal switch 205 so as to normalize the thermal link 220. The link 220 then provides a thermal path from the reservoir 203 to the paramagnetic salt 202. Upon demagnetization, the salt pill $P_1$ cools to about 0.1° K. When thermal link 220 becomes thermally conductive, the temperature of salt pills $P_1$ and $P_2$ equalize. Lastly, after the temperatures of the reservoir $P_2$ and the paramagnetic salt $P_1$ have equalized, the persistent current circulating in thermal switch 205 is destroyed. The removal of the magnetic field from thermal link 202 renders the link superconductive and thus thermally insulates the reservoir 203 from the salt 202. The cycle is now repeated to continue the extraction of heat from the reservoir 203. Note that the structure is arranged so that all heat flow is upwards, i.e., from $P_2$ to $P_1$ and from $P_1$ to reservoir 201.

A detailed description of the operation of a demagnetization refrigerator similar to that of FIG. 12 is contained in Heer, Barnes and Daunt's article "The Design and Operation of a Magnetic Refrigerator for Maintaining Temepratures Below 1° K.", Review of Scientific Instruments, vol. 25, No. 11, pages 1088–1098, November 1954.

The apparatus of FIG. 12 is a single stage refrigerator. In order to obtain even lower temperatures a second stage may be added below pill $P_2$, so that $P_2$ would serve as the high temperature reservoir of a second stage.

The operation of the thermal switch 204 and 205, in order to provide the cycle of operation of the demagnetization refrigerator, is illustrated by the diagram of FIG. 13. FIG. 13 depicts the current pulses applied to the thermal switches 204 and 205, the waveform of the current $I_m$ applied to magnet 234 and the temperature gradient of salt pills $P_1$ and $P_2$.

Referring to FIG. 13, the current $I_m$ is applied to magnet 234 during the interval $t_1$. During this interval, the paramagnetic salt pills $P_1$ is magnetized causing the temperature thereof to increase above 1° K. Beginning at time $t_2$, a current pulse $I_{2b}$ is applied to terminal 217 causing conductor 213 to be rendered normal. Simultaneously therewith, a current pulse $I_{2a}$ is applied to terminal 214 which establishes current flow through inductance 212. As indicated in FIG. 13, current $I_{2a}$ remains on after the cessation of $I_{2b}$ thereby inducing a persistent current in the loop comprising inductance 212 and conductor 213, in the manner described hereinbefore with respect to FIG. 2. Accordingly, the thermal link 208 is rendered normal by the field produced by the current flowing through inductance 212. The normalization of link 208 creates a thermal conductive path from salt pill $P_1$ to constant temperature reservoir 201. As indicated in FIG. 13 by the temperature $T_{p1}$, the temperature of pill $P_1$ equalizes to the temperature of the constant temperature reservoir 201. During interval $t_2$, the current $I_m$ remains constant and thus pill $P_1$ remains magnetized.

At the termination of interval $t_2$, a current pulse $I_{2b}$ is applied to terminal 217 (FIG. 12) which renders conductor 213 normal. The normalization of conductor 213 destroys the persistent current circulating in thermal switch 204. Also, the current $I_m$ begins to decrease toward zero during interval $t_3$. The decreasing current through magnet 234 (FIG. 12) demagnetizes salt pills $P_1$ which then cools to a temperature slightly below approximately 0.1° K.

At the commencement of time interval $t_4$, current pulses and $I_{1a}$ and $I_{1b}$ are respectively applied to terminals 225 and 228 (FIG. 12) thereby inducing a persistent current in the superconducting loop comprising inductance 233 and conductor 224, in the manner described above. The persistent current in thermal switch 205 renders thermal link 220 normal so that a thermal conductive path is established between salt pills $P_1$ and $P_2$. Hence, during interval $t_4$, the temperatures of pills $P_1$ and $P_2$ equalize thereby decreasing the temperature of pill $P_2$. At the termination of interval $t_4$, a second $I_{1a}$ current pulse is applied to terminal 225 which destroys the persistent current circulating in thermal switch 205. The destruction of this current permits thermal link 220 to become superconducting so as to thermally insulate salt pills $P_1$ and $P_2$. This completes one cycle of the adiabatic demagnetization refrigerator of FIG. 12. During the interval $t_5$, work is not performed in the refrigerator. The duration of interval $t_5$ is dependent upon the frequency with which the cycle of the refrigerator must be repeated in order to maintain salt pill $P_2$ at approximately 0.1° K.

It is indicated in FIG. 13, that the temperature $T_{p2}$ of salt pill $P_2$ gradually rises from the beginning of the cycle through the end of inverval $t_3$. During interval $t_4$, the temperature of salt pill $P_2$ is decreased since it is cooled to the temperature of pill $P_1$. At the conclusion of interval $t_4$, the temperature of salt pill $P_2$ increases until the occurrence of another inverval similar to $t_4$. The temperature rise during intervals $t_1$ through $t_3$ of salt pill $P_2$ and also the frequency with which the cycle of the refrigerator must be repeated, is dependent upon the heat losses in the refrigerator of FIG. 12.

When the refrigerator of FIG. 12 is utilized to cool a substance to approximately 0.1° K., the substance is placed in thermal contact with salt pill $P_2$. An appropriate aperture or connection means in order to attach the substance to be cooled to P₂ must be provided, and such means is not illustrated in FIG. 12 since any well-known structure may be utilized.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A superconducting memory device for storing a plurality of bits of information in a plurality of superconductive storage cells including the combination of: a plurality of superconductive storage rings each comprising a segment of superconductive material having a first critical value of magnetic field strength and the remaining portion of said ring having a second critical value of magnetic field strength, said plurality of rings arranged in coordinate rows and columns; a sensing ribbon adjacent to each said ring and comprising a plurality of superconductive areas in the immediate vicinity of each said ring, said superconductive areas having a lower critical value of magnetic field strength than the remaining portions of said ribbon; a plurality of vertical strips of superconductive material, each said strip being adjacent a portion of each said ring in a predetermined column and also being adjacent to one of said superconductive areas of said sensing ribbon; a plurality of horizontal superconducting strips, each said horizontal strip adjacent to a second one of said plurality of areas of said sensing ribbon and also adjacent to a portion of each of said rings in a predetermined horizontal row; means for selectively applying a first current to one of said vertical superconductive strips to thereby render the said areas associated therewith non-superconductive; means for applying a second current to a selected one of said horizontal superconducting strips to thereby render the said areas associated therewith non-superconductive; and sensing means responsive to the change occurring within said sensing ribbon as a result of all said areas associated with the selected ring being non-superconductive to indicate storage of a persistent current therein, said sensing means being ineffective to alter the persistent current stored in the ring selected.

2. An information storage cell comprising a loop fabricated of materials exhibiting superconductive characteristics, said loop including a first segment and a second segment; a first conductor oriented adjacent to said first segment of said loop for applying a magnetic field to said loop; a second conductor oriented adjacent to said first segment and adjacent to said first conductor for applying a second magnetic field to said loop; means for applying a current to said first conductor to establish said first magnetic field in a predetermined direction; means for selectively applying a current of first or second polarities to said second conductor to establish said second magnetic field in a first or second direction respectively, whereby current of said first polarity in said second conductor creates said second magnetic field in a direction to oppose the linkage of said loop by said first field, and alternatively current of said second polarity in said second conductor creates said second field in a direction to aid the linkage of said first field to thereby store a persistent current within said closed current path upon the cessation of said magnetic fields.

3. Apparatus for storing and sensing persistent currents circulating within loops of superconductive materials including the combination of: a plurality of loops arranged in columns and rows, each said loop including a first and second segment of superconductive materials; a plurality of first conductors composed of superconductive material each oriented adjacent to said first segment of each loop comprising a predetermined row of said loops; a plurality of second conductors each oriented adjacent to said first segment of each loop comprising a predetermined column of said loops; a continuous sense ribbon composed of a superconductive material and oriented adjacent to each loop of each row; a first plurality of insets in said sense ribbon, each said inset composed of superconductive material having a lower critical field strength than the remaining portions of said sense ribbon, each inset of said first plurality of insets being disposed adjacent to the second segment of a loop whereby an inset adjacent to a loop storing a persistent current is rendered non-superconductive; a second plurality of insets in said sense ribbon, each oriented adjacent to said first conductor corresponding to a predetermined row of loops and also oriented away from one of said second conductors corresponding to a predetermined column of said loops; a third plurality of insets in said sensing ribbon each composed of a superconductive material having a lower value of critical magnetic field strength than the remaining portion of said sensing ribbon, each said inset oriented adajacent to the appropriate one of said second conductors and oriented away from the appropriate one of said first conductors; means for applying a current to said first conductor to thereby render each inset corresponding thereto non-superconductive; means for applying a current to one of said second conductors to thereby destroy the superconductive characteristics of each inset corresponding thereto; and means for applying a current through said sensing ribbon whereby a voltage drop is experienced in said sensing ribbon at a point wherein the superconductive characteristics of each of said first, second and third insets corresponding to a selected loop is destroyed.

4. Apparatus for sensing the representation of a binary bit of information being stored as a persistent current circulating within a loop fabricated from superconductive materials including the combination of: a loop forming a closed current path and including first and second segments; a first conductor oriented adjacent to said first segment of said loop; a second conductor oriented adjacent to said second segment; a film of superconductive material including a plurality of insets, said plurality of insets arranged intermediate the extremities of said film whereby said insets cause a resistance to be inserted in series with said film only when each of said insets is in its normal conductive condition, a first one of said insets being arranged adjacent only to said second segment of said loop, a second one of said insets being arranged adjacent only to said first conductor and a third one of said insets being arranged adjacent only to said second conductor; and means for selectively applying currents to said first and second conductors and said film to thereby sense the storage of a persistent current circulating within said loop.

5. Apparatus for sensing the storage of representations of binary information as a persistent current circulating within a closed current path fabricated of materials exhibiting superconductive characteristics including the combinations of: a strip of superconductive material adjacent to said path; a first area of superconductive material located within said strip and having a lower crticial value of magnetic field strength then said strip, said first area oriented adjacent only to said first segment of said path; a first conductive strip of superconductive material oriented adjacent to said first segment of said path; a second conductive strip of superconductive material oriented adjacent to said first segment of said path; a second area of superconductive material located within said strip and exhibiting a lower value of critical magnetic field strength than said strip, said second area being oriented adjacent only to said first conductor; a third area of superconductive material inserted within said strip, said third area exhibiting superconductive characteristics similar to said first and second areas, said third area being oriented adjacent only to said second conductive strip; said first, second and third areas being arranged to insert a value of resistance in series with said strip only when each of said areas are simultaneously existing in their non-superconductive states; and means for selectively applying currents to said first and second conductive strips and said strip for causing a voltage signal to appear across said strip in response to a persistent current stored within said path.

6. Apparatus for controlling the thermal conductivity of a superconductive thermal conductor including the combination of, a first inductance magnetically coupled to said thermal conductor, a superconductive element connected in parallel with said inductance to form a closed loop, means coupled in said loop for inducing a persistent current therein whereby said current renders said thermal conductor non-superconductive to act as a thermal conductor, and means coupled to said element for rendering the latter normally conductive, whereby a persistent current flowing in said loop is dissipated thereby rendering said thermal conductor superconductive to act as a thermal insulator.

7. A thermal valve for controlling the flow of heat currents including a combination of, a conductor reacting as a thermal insulator and a thermal conductor when respectively in the normal and superconductive states, a superconductive loop magnetically coupled to said conductor, means for inducing a persistent current in said loop to thereby render said conductor thermally conductive, and means coupled to said loop for dissipating a persistent current circulating therein whereby said conductor becomes a thermal insulator.

8. Apparatus for sensing the storage of information represented as a persistent current stored in a superconductive storage device, including the combination of: a thin film of material exhibiting superconductive characteristics for storing a persistent current; means for inducing a persistent current within said film to thereby repesent the storage of information; and sensing means including materials exhibiting superconductive properties responsive to a persistent current stored in said film for producing an electrical output representing stored information without destruction of the information therein.

9. Apparatus for reading in and reading out information stored in a superconductive device and represented by a persistent current circulating within said device comprising the combination of: a plurality of closed current paths, each fabricated of material having superconductive characteristics, each said path being capable of storing an induced persistent current; selection means for selecting one of said plurality of paths during read and write operations; and superconductive sensing means adjacent to each said path and responsive to assume either a superconductive or resistive state according to the persistent current stored in said path to produce an electrical output representative of the information stored in the said path.

10. The apparatus claimed in claim 9 wherein said selection means comprises a plurality of selection conductors, each said conductor being fabricated of a material exhibiting superconductive characteristics and maintained in a superconductive state, each said conductor oriented adjacent to a group of said paths; and further includes means for selectively applying currents to selected ones of said conductors for reading in or reading out information from the selected path.

11. The apparatus claimed in claim 9 wherein said selection means comprises a plurality of selection conductors each composed of material having superconductive characteristics, and each said conductor being magnetically coupled to a group of said plurality of paths; and means for selectively controlling the degree of magnetic coupling between said conductors and said path, whereby the coincidence of magnetic fields created by at least two of said conductors links one of said paths causing a persistent current to be induced in the path selected thereby representing the storage of information.

12. The apparatus claimed in claim 9 wherein said selection means includes first means for applying a first magnetic field having a predetermined orientation to a selected group of said paths, second means for applying a second magnetic field also having a predetermined orientation different from that of said first magnetic field to another selected group of said paths, and means for reversing the direction of orientation of one of said magnetic fields, whereby a persistent current is induced in the selected path only when said first and second fields additively create a resultant field which couples said selected path.

13. The apparatus as claimed in claim 9 wherein each said closed current path comprises a loop having first and second segments, said second segment comprising a superconductive material which loses its superconductive characteristics upon the application thereto of a lower magnitude of magnetic field strength than required to destroy the superconductive characteristics of said first segment; and further wherein said selection means includes means for selectively applying a magnetic field to a selected one of said paths to thereby render the second segment thereof non-superconductive for a predetermined time interval, whereby the removal of said magnetic field from the selected path causes a persistent current to be induced therein.

14. The apparatus as claimed in claim 9 wherein each said closed current path comprises a loop having first and second segments, said second segment being capable of being switched from its superconductive to its normal conductive condition by the application thereto of a magnetic field of predetermined intensity, and further wherein said selection means includes means for selectively applying a magnetic field to one of said paths for a predetermined time interval, whereby the application of said field followed by the removal thereof is effective to induce a persistent current in the selected path.

15. The apparatus as claimed in claim 9 wherein said sensing means includes a member fabricated of material exhibiting superconductive characteristics, said member being magnetically coupled to a group of said paths, whereby a portion of said member is subjected to a magnetic field created by a persistent current flowing in one of said paths, said magnetic field rendering said portion non-superconductive.

16. The apparatus as claimed in claim 9 wherein said sensing means includes at least two members associated with each said path and fabricated from material exhibiting superconductive characteristics, a first one of said members being magnetically coupled to the selected path whereby said first member loses its superconductive characteristics when said selected path is storing a persistent current; and further wherein said selection means is effective to destroy the superconductive characteristics of the remaining members associated with said selected path, and means responsive to the simultaneous non-superconductive condition of all said members for producing an electrical representation of the information stored in said selected path.

17. Apparatus for storing persistent currents, each circulating within a loop of superconductive material, comprising the combination of: a plurality of superconductive loops arranged in a matrix; a first plurality of elements coupled to predetermined ones of said loops for selecting a first coordinate of said matrix; a second plurality of elements coupled to predetermined ones of said loops for selecting a second coordinate of said matrix; and means for selectively applying currents to selected ones of said first and second elements whereby a current is established in the selected loop which persists therein without the further application of current when said currents are removed.

18. Apparatus for storing information represented by a persistent current circulating in a loop of superconductive material, said apparatus including the combination of: a plurality of superconductive loops arranged in a matrix; first means for applying a magnetic field of a predetermined value and of a first orientation to preselected ones of said loops; second means for applying a magnetic field of a predetermined value and of an orientation different from said first orientation to other preselected ones of said loops; and means for selectively controlling said first and second means, whereby the coincidence of both of said magnetic fields at any selected loop destroys the superconductive characteristics thereof, and upon the removal of both said magnetic fields a persistent current is induced within said selected loop to thereby represent the storage of information.

19. An information storage cell comprising a closed current path fabricated of materials exhibiting superconductive characteristics said path including first and second segments, said second segment having a lower critical magnetic field value than said first segment; means for establishing a first magnetic field adjacent to said path whereby flux from said first field links portions of said first and second segments of said path; means for establishing a second magnetic field adjacent to said path so that flux from said second field links said first and second segments of said path, said second field being positioned to combine with said first field to produce a resultant field; and means for selectively controlling the direction of said second field to thereby control the location of said resultant field with respect to said path, whereby the application of said resultant field to said second segment renders said second segment non-superconductive to dissipate a current therein, and when said resultant field links said closed path a persistent current is induced therein upon the cessation of said resultant field.

20. A superconductor device comprising a superconductor element maintained at a temperature at which it is in a superconductive state in the absence of a magnetic field; and means for controlling the state, superconductive or normal, of said superconductor element including a closed loop of superconductor material at least a portion of which is arranged in magnetic field applying relationship to said superconductor element, and means coupled to said superconductor loop for establishing persistent current therein; said superconductor element being controllable between normal and superconductive states in response to the magnetic field produced by said persistent current established in said loop.

21. A storage cell for storing persistent current including the combination of a closed current loop composed of superconductor material; first means for maintaining the temperature of said loop below the transition temperature thereof; second means operable for selectively rendering a segment of said loop superconducting or non-superconducting; third means operable for establishing a current in said loop; said second means comprising a plurality of selection conductors oriented adjacent said segment of said loop; said third means comprising a winding encompassing the periphery of said loop for providing flux linking said loop; and means for operating said second and third means to establish in said loop a current which persists therein in response to the cessation of said flux after said loop is returned to the superconductive state.

22. A storage cell for storing persistent current including the combination of a closed current loop composed of superconductor material and defining an aperture; first means for maintaining the temperature of said loop below the transition temperature thereof; second means for selectively rendering a segment of said loop superconducting or non-superconducting; third means for establishing a current in said loop; said second means comprising a plurality of selection conductors arranged adjacent said loop to divide said aperture into two apertures of equal shape and area, and said third means comprising a winding oriented in the plane of said loop and encompassing the periphery thereof for providing a flux linking said two apertures equally.

23. A superconductor storage device including a loop of superconductor material for storing a persistent current; said loop defining an aperture; control conductor means rendering said loop non-superconductive thereby dissipating a persistent current therein; and a magnetic field means providing a flux through said aperture for a predetermined time interval; whereby a persistent current is induced in said loop upon the cessation of said flux after the loop is returned to the superconductive state; said control conductor means comprising a plurality of conductors intersecting said aperture for applying to said loop a substantial uniform magnetic field and said magnetic field means comprising a winding encompassing the periphery of said loop.

24. A thermal switch alternatively operable as a thermal conducting path and a thermal insulator comprising, superconducting thermal link for controlling the conduction of heat therethrough, a closed current path formed of superconducting material magnetically coupled to said thermal link for controlling the thermal conductivity of said link, and means for establishing a persistent current in said path to change said link from a thermal insulator to a thermal conductor, whereby said link remains thermally conductve without the further application of electrical energy to said path, said closed current path comprising a first superconductive material having a first critical value of magnetic field strength, and a second superconductive material having a larger critical field value than said first material, said first and second materials arranged in a continuous loop; said second material being magnetically coupled to said link; and means for rendering said first material non-superconductive, whereby a persistent current circulating in said loop is dissipated when said first material is rendered non-superconductive to thereby change said link from a thermal conductor to a thermal insulator.

25. A thermal switch alternatively operable as a thermal conducting path and a thermal insulator comprising, a superconducting thermal link for controlling the conduction of heat therethrough, a closed current path formed of superconducting material magnetically coupled to said thermal link for controlling the thermal conductivity of said link, and means for establishing a persistent current in said path to change said link from a thermal insulator to a thermal conductor, whereby said link remains thermally conductive without the further application of electrical energy to said path, said closed current path including a superconductive control conductor arranged adjacent said thermal link for applying a magnetic field thereto when a persistent current is flowing in said path, and a conductor connected in parallel with said control conductor and magnetically controllable by said means, whereby the application of a magnetic field to said conductor by said means renders the former non-superconductive thereby dissipating a persistent current previously established in said path.

26. An electrical switch alternately operable as a super-conducting path of zero resistance and a normally resisitive path of finite resistance comprising; a superconducting link; a closed current path formed of superconducting material including a portion arranged in magnetic field applying relationship to said link for controlling the electrical conductivity of said link; input means for establishing a persistant current in said path to change said link from a superconducting link of zero resistance to a normally resistive link of finite resistance; whereby said link remains normally resistive without the further application of electrical energy to said path; said closed current path comprising a first superconducting material having a first critical value of magnetic field strength and a second super-conducting material having a larger critical value than said first material; said first and second materials arranged in a continuous loop; said second material being arranged in magnetic field applying relationship to said link; said input means including means for rendering said first material non-superconductive; whereby a persistent current circulating in said loop is dissipated when said first material is rendered non-superconductive to change said link from a normally resistive link of finite resistance to a superconducting resistive link of zero resistance.

27. An electrical switch alternately operable as a superconducting path and a normally resistive path comprising; a superconducting electrical link; a closed current path formed of superconducting material magnetically coupled to said link for controlling the electrical conductivity of said link; means for establishing a persistent current in said path to change said link from a superconducting link to a normally resistive link; whereby said link remains normally resisitive without the further application of electrical energy to said path; said closed current path including a superconductive control conductor arranged adjacent said link for applying a magnetic field thereto when a persistent current is flowing in said path; and a conductor connected in parallel with said control conductor and magnetically controllable by said means, whereby the application of a magnetic field to said conductor by said means renders the former non-superconductive thereby dissipating a persistent current previously established in said path.

28. A circuit comprising a closed loop of superconductive material capable of assuming a plurality of different stable states each representative of an information value; said loop being entirely superconducting when in each of said stable states and when in one of said stable states having a current flowing therein which persists in said loop without the application of electrical energy to said loop; means coupled to said loop for selectively causing it to assume said states; said last named means including means for causing at least a portion of said loop to undergo transitions between superconductive and normal states and for producing current in at least a portion of said loop; and means for sensing the stable state of said loop including a superconductive output means arranged adjacent said loop and responsive to the magnetic field produced by said current which persists in said loop when said loop is in said one stable state; whereby said superconductive output means is controlled between superconducting and resistive states in response to the persistent current stored in said loop.

29. The circuit of claim 28 wherein said means for sensing the state of said loop includes a selection conductor arranged in magnetic field applying relationship to said superconductive output means for said loop and means for applying current signals to said selection conductor; said superconductive output means being controllable between superconductive and resistive states in response to magnetic fields produced by persistent current flowing in said loop and current signals applied to said selective conductor.

30. A superconductive circuit comprising: first and second parallel paths forming a closed superconductive loop; said superconductive loop being capable of assuming first and second different stable states and being completely superconductive when in either of said states; means for selectively causing said loop to assume said stable states; and output means for said loop including a superconductive output conductor; said loop including a control conductor arranged adjacent said superconductive output conductor; said control conductor carrying sufficient current to control said superconductive output conductor between superconductive and resistive states only when said loop is in said first stable state.

31. The circuit of claim 30 wherein said means for causing said loop to assume said first and second stable states includes first and second conductors each arranged in magnetic field applying relationship to a portion of said loop; said first and second conductors extending substantially at right angles to each other to apply fields of different orientation to said portion of said loop.

32. A memory comprising a plurality of superconductive loops arranged in a matrix; a first group of selection means coupled to predetermined ones of said loops for selecting a first coordinate of said matrix; a second group of selection means coupled to predetermined ones of said loops for selecting a second coordinate of said matrix; means for selectively applying and removing currents to selected ones of said selection means in said first and second groups to introduce resistance into at least a portion of a selected one of said loops and provide a current which persists in said selected loop upon removal of said applied currents without the further application of electrical energy to said loop; and output means for said memory including means responsive to the magnetic fields produced by current established in said loops.

33. The memory of claim 32 wherein said output means includes a superconductor element arranged adjacent each loop and controllable between superconducting and resistive states in response to magnetic fields produced by currents in said loop.

34. A memory comprising a group of superconductive loops arranged in a matrix; each said loop being capable of assuming first and second different stable information states and of remaining stably in each of these states when completely superconductive; a first group of selection means arranged adjacent predetermined ones of said loops for selecting a first coordinate of said matrix; a second group of selection means arranged adjacent predetermined ones of said loop by selecting a second coordinate of said matrix; means for selectively applying and removing current to selected ones of the selection means in said first and second groups to introduce resistance into at least a portion of a selected one of said loops and to cause said loop to assume one of said stable information states; said loop becoming completely superconductive upon the removal of said currents and remaining stably in the information representing state it has been caused to assume; and output means for said memory including a plurality of superconductive elements each arranged adjacent one of said loops and controllable between superconductive and resistive states in accordance with the stable information state of the loop.

35. A superconductor circuit comprising a thin film superconductive storage device for storing a persistent current in a closed superconductive path formed by the film; coincident current means for inducing persistent currents in said film storage device comprising, a first control conductor arranged adjacent said film storage device in magnetic field applying relationship thereto, a second control conductor arranged adjacent said film storage device in magnetic field applying relationship thereto; said first and said second control conductors extending substantially at right angles to each other adjacent said film storage device; and means for selectively applying current to said first and said second control conductors.

36. The invention of claim 35 wherein said means for applying current signals includes means for selectively applying current of different polarity to at least one of said control conductors.

37. An electrical device comprising an electrically isolated control circuit constructed of a superconductive material arranged in a closed loop to sustain a persistent circulating current, a gate circuit inductively coupled to said control circuit, said gate circuit being constructed of a superconductive material capable of being rendered electrically resistive in response to a persistent circulating current flowing in said control circuit, and means for applying current pulses to said gate circuit to develop a voltage at the gate circuit indicating the presence of a persistent circulating current in said control circuit.

References Cited by the Examiner

UNITED STATES PATENTS

| | | | |
|---|---|---|---|
| 1,818,437 | 8/1931 | Stuart | 62—1 |
| 2,147,283 | 2/1939 | Covell | 257—1 |
| 2,246,329 | 6/1941 | Telkes | 257—1 |
| 2,691,154 | 10/1954 | Rajchman | 340—174 |
| 2,719,965 | 10/1955 | Person | 340—174 |
| 2,743,430 | 4/1956 | Schultz et al. | 340—173 |
| 2,764,390 | 9/1956 | Harris | 257—1 |
| 2,780,069 | 2/1957 | Olcott | 62—1 |
| 2,784,389 | 3/1957 | Kelly | 340—173 |
| 2,800,772 | 7/1957 | Carroll | 62—3 |
| 2,823,369 | 2/1958 | Haug et al. | 340—173 |
| 2,832,897 | 4/1958 | Buck | 340—173 |

OTHER REFERENCES

Pages 19–25, June 1946, "Superconductivity" (Hewlett), General Electric Review, vol. 49, No. 6.

Pages 1088–1098, November 1954, "The Design and Operation of a Magnetic Refrigerator for Maintaining Temperatures Below 1° K." (Heer et al.), The Review of Scientific Instruments, vol. 25, No. 11.

Pages 861–867, October 1, 1951, No. 382A, "Experiments on the Production of Very Low Temperatures by Two-Stage Demagnetization" (Darby et al.), The Proceedings of the Physical Society, Section A, vol. 64, Part 10.

Pages 482–493, April 1956, "The Cryotron—A Superconductive Computer Component" (Buck), Proceedings of the I.R.E., vol 44, Issue 4.

BERNARD KONICK, *Primary Examiner.*

JOEL REZNEK, EVERETT R. REYNOLDS, IRVING L. SRAGOW, STEPHEN W. CAPELLI, *Examiners.*

W. J. WYE, K. E. JACOBS, J. P. VANDENBURG, N. N. KUNITZ, L. S. GRODBERG, T. W. FEARS,
*Assistant Examiners.*